(12) United States Patent
Ritchey

(10) Patent No.: US 9,584,056 B2
(45) Date of Patent: *Feb. 28, 2017

(54) POLYPHASIC MULTI-COIL GENERATOR

(71) Applicant: Exro Technologies, Inc., West Vancouver (CA)

(72) Inventor: Jonathan Ritchey, Vernon (CA)

(73) Assignee: EXRO TECHNOLOGIES INC., North Vancouver (CA)

( * ) Notice: Subject to any disclaimer, the term of this patent is extended or adjusted under 35 U.S.C. 154(b) by 250 days.

This patent is subject to a terminal disclaimer.

(21) Appl. No.: 14/185,525

(22) Filed: Feb. 20, 2014

(65) Prior Publication Data

US 2014/0167708 A1    Jun. 19, 2014

Related U.S. Application Data

(63) Continuation of application No. 13/899,420, filed on May 21, 2013, now abandoned, which is a
(Continued)

(51) Int. Cl.
*H02P 9/02* (2006.01)
*H02K 3/28* (2006.01)
(Continued)

(52) U.S. Cl.
CPC .................. *H02P 9/48* (2013.01); *H02K 3/28* (2013.01); *H02K 16/00* (2013.01); *H02K 21/12* (2013.01); *H02K 21/24* (2013.01); *H02P 9/02* (2013.01)

(58) Field of Classification Search
CPC .. H02K 16/00; H02K 3/28; H02P 9/48; H02P 9/02; B60K 6/26; B60K 6/405; B60W 10/08
See application file for complete search history.

(56) References Cited

U.S. PATENT DOCUMENTS 908,097 A    12/1908 Herz
1,980,808 A    11/1934 Leibing
(Continued)

FOREIGN PATENT DOCUMENTS

CA    1038918    9/1978
CA    2 459 126 A1    4/2003
(Continued)

OTHER PUBLICATIONS

Canadian Office Action, for Canadian Application No. 2,487,668, dated Oct. 6, 2011, 4 pages.
(Continued)

*Primary Examiner* — Tran Nguyen
(74) *Attorney, Agent, or Firm* — Seed IP Law Group LLP

(57) ABSTRACT

A polyphasic multi-coil generator includes a driveshaft, at least first and second rotors rigidly mounted on the driveshaft so as to simultaneously synchronously rotate with rotation of the driveshaft, and at least one stator sandwiched between the first and second rotors. The stator has an aperture through which the driveshaft is rotatably journalled. A stator array on the stator has an equally circumferentially spaced-apart array of electrically conductive coils mounted to the stator in a first angular orientation about the driveshaft. The rotors and the stator lie in substantially parallel planes. The first and second rotors have, respectively, first and second rotor arrays.

15 Claims, 22 Drawing Sheets

Related U.S. Application Data continuation of application No. 13/336,727, filed on Dec. 23, 2011, now abandoned, which is a continuation of application No. 12/582,655, filed on Oct. 20, 2009, now Pat. No. 8,106,563, which is a continuation of application No. 11/760,704, filed on Jun. 8, 2007, now abandoned.

(60) Provisional application No. 60/804,279, filed on Jun. 8, 2006.

(51) Int. Cl.
 *H02P 9/48* (2006.01)
 *H02K 16/00* (2006.01)
 *H02K 21/12* (2006.01)
 *H02K 21/24* (2006.01)

(56) References Cited

U.S. PATENT DOCUMENTS

| | | |
|---|---|---|
| 2,091,190 A | 8/1937 | Tognola |
| 2,189,524 A | 2/1940 | Randolph et al. |
| 2,407,883 A | 9/1946 | Jackson |
| 2,432,117 A | 12/1947 | Morton |
| 2,488,729 A | 11/1949 | Kooyman |
| 2,504,681 A | 4/1950 | Hall |
| 2,516,114 A | 7/1950 | Green |
| 2,601,517 A | 6/1952 | Hammes |
| 2,680,822 A | 6/1954 | Brainard |
| 2,719,931 A | 10/1955 | Kober |
| 3,083,311 A | 3/1963 | Krasnow |
| 3,149,256 A | 9/1964 | Kohlhagen |
| 3,153,157 A | 10/1964 | Rabe |
| 3,169,203 A | 2/1965 | Lavin et al. |
| 3,223,865 A | 12/1965 | Gladstone |
| 3,237,034 A | 2/1966 | Krasnow |
| 3,293,470 A | 12/1966 | Polgreen |
| 3,411,027 A | 11/1968 | Rosenberg |
| 3,482,156 A | 12/1969 | Porath |
| 3,549,925 A | 12/1970 | Johnson |
| 3,621,370 A | 11/1971 | Vandervort |
| 3,713,015 A | 1/1973 | Frister |
| 3,801,844 A | 4/1974 | Steele |
| 3,809,936 A | 5/1974 | Klein |
| 3,903,863 A | 9/1975 | Katsumata |
| 3,942,913 A | 3/1976 | Bokelman |
| 3,944,855 A | 3/1976 | Le Van |
| 3,965,669 A | 6/1976 | Larson et al. |
| 3,973,137 A | 8/1976 | Drobina |
| 3,973,501 A | 8/1976 | Briggs |
| 3,984,750 A | 10/1976 | Pfeffer et al. |
| 3,992,641 A | 11/1976 | Heinrich et al. |
| 4,001,887 A | 1/1977 | Platt et al. |
| 4,004,426 A | 1/1977 | Laing |
| 4,013,937 A | 3/1977 | Pelly et al. |
| 4,015,174 A | 3/1977 | Cotton de Bennotot |
| 4,020,369 A | 4/1977 | Shoupp et al. |
| 4,023,751 A | 5/1977 | Richard |
| 4,039,848 A | 8/1977 | Winderl |
| 4,050,295 A | 9/1977 | Harvey |
| 4,051,402 A | 9/1977 | Gruber |
| 4,074,159 A | 2/1978 | Robison |
| 4,074,180 A | 2/1978 | Sharpe et al. |
| 4,081,726 A | 3/1978 | Brimer et al. |
| 4,095,922 A | 6/1978 | Farr |
| 4,100,743 A | 7/1978 | Trumbull et al. |
| 4,107,987 A | 8/1978 | Robbins et al. |
| 4,126,933 A | 11/1978 | Anderson et al. |
| 4,141,331 A | 2/1979 | Mallory, Jr. |
| 4,142,969 A | 3/1979 | Nottingham |
| 4,151,051 A | 4/1979 | Evans |
| 4,155,252 A | 5/1979 | Morrill |
| 4,168,459 A | 9/1979 | Roesel, Jr. |
| 4,179,633 A | 12/1979 | Kelly |
| 4,181,468 A | 1/1980 | Kent et al. |
| 4,187,441 A | 2/1980 | Oney |
| 4,191,893 A | 3/1980 | Grana et al. |
| 4,196,572 A | 4/1980 | Hunt |
| 4,203,710 A | 5/1980 | Farr |
| 4,211,945 A | 7/1980 | Tawse |
| 4,215,426 A | 7/1980 | Klatt |
| 4,237,391 A | 12/1980 | Schur et al. |
| 4,245,601 A | 1/1981 | Crowder |
| 4,246,490 A | 1/1981 | Keramati et al. |
| 4,247,785 A | 1/1981 | Apgar |
| 4,253,031 A | 2/1981 | Frister |
| 4,254,344 A | 3/1981 | Fancy et al. |
| 4,260,901 A | 4/1981 | Woodbridge |
| 4,261,312 A | 4/1981 | Hart |
| 4,261,562 A | 4/1981 | Flavell |
| 4,276,481 A | 6/1981 | Parker |
| 4,286,581 A | 9/1981 | Atkinson, Jr. |
| 4,289,970 A | 9/1981 | Deibert |
| 4,291,235 A | 9/1981 | Bergey, Jr. et al. |
| 4,297,604 A | 10/1981 | Tawse |
| 4,302,683 A | 11/1981 | Burton |
| 4,305,031 A | 12/1981 | Wharton |
| 4,308,479 A | 12/1981 | Richter |
| 4,316,096 A | 2/1982 | Syverson |
| 4,317,437 A | 3/1982 | Lindgren |
| 4,322,667 A | 3/1982 | Ohba |
| 4,329,138 A | 5/1982 | Riordan |
| 4,339,704 A | 7/1982 | McSparran et al. |
| 4,340,822 A | 7/1982 | Gregg |
| 4,355,276 A | 10/1982 | Vittay |
| 4,358,693 A | 11/1982 | Palmer et al. |
| 4,364,005 A | 12/1982 | Kohzai et al. |
| 4,373,488 A | 2/1983 | Neuhalfen |
| 4,385,246 A | 5/1983 | Schur et al. |
| 4,402,524 A | 9/1983 | D'Antonio et al. |
| 4,406,950 A | 9/1983 | Roesel, Jr. |
| 4,412,170 A | 10/1983 | Roesel, Jr. |
| 4,419,617 A | 12/1983 | Reitz |
| 4,433,280 A | 2/1984 | Lindgren |
| 4,433,355 A | 2/1984 | Chew et al. |
| 4,434,617 A | 3/1984 | Walsh |
| 4,444,444 A | 4/1984 | Benedetti et al. |
| 4,446,377 A | 5/1984 | Kure-Jensen et al. |
| 4,454,865 A | 6/1984 | Tammen |
| 4,456,858 A | 6/1984 | Loven |
| 4,458,489 A | 7/1984 | Walsh |
| 4,459,536 A | 7/1984 | Wirtz |
| 4,473,751 A | 9/1984 | Rombach et al. |
| 4,477,745 A | 10/1984 | Lux |
| 4,503,368 A | 3/1985 | Sakamoto |
| 4,511,805 A | 4/1985 | Boy-Marcotte et al. |
| 4,513,576 A | 4/1985 | Dibrell et al. |
| RE31,947 E | 7/1985 | Farr |
| 4,532,431 A | 7/1985 | Iliev et al. |
| 4,532,460 A | 7/1985 | Gale et al. |
| 4,535,263 A | 8/1985 | Avery |
| 4,536,668 A | 8/1985 | Boyer |
| 4,536,672 A | 8/1985 | Kanayama et al. |
| 4,539,485 A | 9/1985 | Neuenschwander |
| 4,549,121 A | 10/1985 | Gale |
| 4,575,671 A | 3/1986 | Lee et al. |
| 4,578,609 A | 3/1986 | McCarty |
| 4,581,999 A | 4/1986 | Campagnuolo et al. |
| 4,591,746 A | 5/1986 | Kamiyama |
| 4,598,240 A | 7/1986 | Gale et al. |
| 4,599,551 A | 7/1986 | Wheatley et al. |
| 4,601,354 A | 7/1986 | Campbell et al. |
| 4,605,874 A | 8/1986 | Whiteley |
| 4,628,219 A | 12/1986 | Troscinski |
| 4,630,817 A | 12/1986 | Buckley |
| 4,638,224 A | 1/1987 | Gritter |
| 4,641,080 A | 2/1987 | Glennon et al. |
| 4,642,031 A | 2/1987 | Farr |
| 4,642,988 A | 2/1987 | Benson |
| 4,644,233 A | 2/1987 | Suzuki |
| 4,654,066 A | 3/1987 | Garcia et al. |
| 4,654,537 A | 3/1987 | Gaspard |
| 4,656,379 A | 4/1987 | McCarty |
| 4,658,166 A | 4/1987 | Oudet |

(56) References Cited

U.S. PATENT DOCUMENTS

| | | |
|---|---|---|
| 4,658,346 A | 4/1987 | Templeton |
| 4,664,685 A | 5/1987 | Young |
| 4,668,885 A | 5/1987 | Scheller |
| 4,674,199 A | 6/1987 | Lakic |
| 4,678,954 A | 7/1987 | Takeda et al. |
| 4,682,067 A | 7/1987 | Oudet |
| 4,687,945 A | 8/1987 | Ebeling |
| 4,692,675 A | 9/1987 | Falk |
| 4,698,538 A | 10/1987 | Yoshida |
| 4,698,562 A | 10/1987 | Gale et al. |
| 4,710,667 A | 12/1987 | Whiteley |
| 4,713,569 A | 12/1987 | Schwartz |
| 4,729,218 A | 3/1988 | Haselbauer et al. |
| 4,737,070 A | 4/1988 | Horiuchi et al. |
| 4,739,203 A | 4/1988 | Miyao et al. |
| 4,783,028 A | 11/1988 | Olson |
| 4,783,038 A | 11/1988 | Gilbert et al. |
| 4,785,228 A | 11/1988 | Goddard |
| 4,806,812 A | 2/1989 | Masterman |
| 4,809,510 A | 3/1989 | Gaspard et al. |
| 4,811,091 A | 3/1989 | Morrison et al. |
| 4,814,651 A | 3/1989 | Elris et al. |
| 4,819,361 A | 4/1989 | Boharski |
| 4,831,300 A | 5/1989 | Lindgren |
| 4,835,433 A | 5/1989 | Brown |
| 4,839,039 A | 6/1989 | Parsons et al. |
| 4,843,270 A | 6/1989 | Dijken |
| 4,845,749 A | 7/1989 | Brickell et al. |
| 4,851,703 A | 7/1989 | Means |
| 4,862,021 A | 8/1989 | LaRocca |
| 4,864,151 A | 9/1989 | Wyczalek et al. |
| 4,866,321 A | 9/1989 | Blanchard et al. |
| 4,872,805 A | 10/1989 | Horiuchi et al. |
| 4,874,346 A | 10/1989 | Wachspress |
| 4,876,991 A | 10/1989 | Galitello, Jr. |
| 4,879,045 A | 11/1989 | Eggerichs |
| 4,879,484 A | 11/1989 | Huss |
| 4,879,501 A | 11/1989 | Haner |
| 4,884,953 A | 12/1989 | Golben |
| 4,885,526 A | 12/1989 | Szabo |
| 4,893,040 A | 1/1990 | Turner et al. |
| 4,904,926 A | 2/1990 | Pasichinskyj |
| 4,906,877 A | 3/1990 | Ciaio |
| 4,914,412 A | 4/1990 | Engdahl et al. |
| 4,927,329 A | 5/1990 | Kliman et al. |
| 4,933,609 A | 6/1990 | Clark |
| 4,950,973 A | 8/1990 | Kouba |
| 4,953,052 A | 8/1990 | Cartlidge et al. |
| 4,959,605 A | 9/1990 | Vaidya et al. |
| 4,963,780 A | 10/1990 | Hochstrasser |
| 4,973,868 A | 11/1990 | Wust |
| 4,977,529 A | 12/1990 | Gregg et al. |
| 4,980,595 A | 12/1990 | Arora |
| 4,985,875 A | 1/1991 | Mitchell |
| 4,994,700 A | 2/1991 | Bansal et al. |
| 5,002,020 A | 3/1991 | Kos |
| 5,003,209 A | 3/1991 | Huss et al. |
| 5,003,517 A | 3/1991 | Greer, Jr. |
| 5,021,698 A | 6/1991 | Pullen et al. |
| 5,030,867 A | 7/1991 | Yamada et al. |
| 5,043,592 A | 8/1991 | Hochstrasser |
| 5,043,911 A | 8/1991 | Rashid |
| 5,047,680 A | 9/1991 | Török |
| 5,053,662 A | 10/1991 | Richter |
| 5,057,726 A | 10/1991 | Mole et al. |
| 5,057,731 A | 10/1991 | Hancock |
| 5,058,833 A | 10/1991 | Carmouche |
| 5,072,145 A | 12/1991 | Davis et al. |
| 5,117,142 A | 5/1992 | Von Zweygbergk |
| 5,120,332 A | 6/1992 | Wells |
| 5,130,595 A | 7/1992 | Arora |
| 5,155,375 A | 10/1992 | Holley |
| 5,164,826 A | 11/1992 | Dailey |
| 5,174,109 A | 12/1992 | Lampe |
| 5,184,040 A | 2/1993 | Lim |
| 5,184,458 A | 2/1993 | Lampe et al. |
| 5,191,256 A | 3/1993 | Reiter, Jr. et al. |
| 5,208,498 A | 5/1993 | Hamajima |
| 5,220,223 A | 6/1993 | Mehnert |
| 5,220,232 A | 6/1993 | Rigney, II et al. |
| 5,225,712 A | 7/1993 | Erdman |
| 5,227,702 A | 7/1993 | Nahirney |
| 5,237,815 A | 8/1993 | McArthur |
| 5,237,817 A | 8/1993 | Bornemisza et al. |
| 5,258,697 A | 11/1993 | Ford et al. |
| 5,267,129 A | 11/1993 | Anderson |
| 5,281,094 A | 1/1994 | McCarty et al. |
| 5,283,488 A | 2/1994 | Ponnappan et al. |
| 5,289,041 A | 2/1994 | Holley |
| 5,289,072 A | 2/1994 | Lange |
| 5,317,498 A | 5/1994 | Dhyandchand et al. |
| 5,336,933 A | 8/1994 | Ernster |
| 5,346,370 A | 9/1994 | Krohn |
| 5,355,044 A | 10/1994 | Uchida et al. |
| 5,369,324 A | 11/1994 | Saether |
| 5,370,112 A | 12/1994 | Perkins |
| 5,371,426 A | 12/1994 | Nagate et al. |
| 5,397,922 A | 3/1995 | Paul et al. |
| 5,400,596 A | 3/1995 | Shlien |
| 5,406,186 A | 4/1995 | Fair |
| 5,409,435 A | 4/1995 | Daniels |
| 5,413,010 A | 5/1995 | Nakanishi et al. |
| 5,427,194 A | 6/1995 | Miller |
| 5,433,175 A | 7/1995 | Hughes et al. |
| 5,448,123 A | 9/1995 | Nilson et al. |
| 5,468,378 A | 11/1995 | de la Torre Barreiro |
| 5,469,045 A | 11/1995 | Dove et al. |
| 5,473,205 A | 12/1995 | Haaland |
| 5,481,146 A | 1/1996 | Davey |
| 5,484,120 A | 1/1996 | Blakeley et al. |
| 5,489,290 A | 2/1996 | Furnish |
| 5,489,810 A | 2/1996 | Ferreira et al. |
| 5,496,238 A | 3/1996 | Taylor |
| 5,504,382 A | 4/1996 | Douglass et al. |
| 5,512,811 A | 4/1996 | Latos et al. |
| 5,517,822 A | 5/1996 | Haws et al. |
| 5,523,635 A | 6/1996 | Ferreira et al. |
| 5,523,637 A | 6/1996 | Miller |
| 5,530,307 A | 6/1996 | Horst |
| 5,568,005 A | 10/1996 | Davidson |
| 5,594,289 A | 1/1997 | Minato |
| 5,614,773 A | 3/1997 | Fabris |
| 5,619,423 A | 4/1997 | Scrantz |
| 5,625,241 A * | 4/1997 | Ewing .................. H02K 21/12 310/152 |
| 5,626,103 A | 5/1997 | Haws et al. |
| 5,637,934 A | 6/1997 | Fabris |
| 5,637,935 A | 6/1997 | Haaland |
| 5,641,276 A | 6/1997 | Heidelberg et al. |
| 5,650,679 A | 7/1997 | Boggs, III et al. |
| 5,653,135 A | 8/1997 | Miller et al. |
| 5,659,300 A | 8/1997 | Dresselhuys et al. |
| 5,682,073 A | 10/1997 | Mizuno |
| 5,689,165 A | 11/1997 | Jones et al. |
| 5,689,175 A | 11/1997 | Hanson et al. |
| 5,690,209 A | 11/1997 | Kofoed |
| 5,696,413 A | 12/1997 | Woodbridge et al. |
| 5,696,419 A | 12/1997 | Rakestraw et al. |
| 5,708,314 A | 1/1998 | Law |
| 5,709,103 A | 1/1998 | Williams |
| 5,710,474 A | 1/1998 | Mulgrave |
| 5,715,716 A | 2/1998 | Miller et al. |
| 5,717,316 A | 2/1998 | Kawai |
| 5,719,458 A | 2/1998 | Kawai |
| 5,720,194 A | 2/1998 | Miller et al. |
| 5,726,517 A | 3/1998 | Gueraud et al. |
| 5,731,649 A | 3/1998 | Caamaño |
| 5,735,123 A | 4/1998 | Ehrig |
| 5,736,838 A | 4/1998 | Dove et al. |
| 5,744,896 A | 4/1998 | Kessinger, Jr. et al. |
| 5,753,989 A | 5/1998 | Syverson et al. |
| 5,760,507 A | 6/1998 | Miller et al. |
| 5,762,584 A | 6/1998 | Daniels |
| 5,773,910 A | 6/1998 | Lange |

(56) References Cited

U.S. PATENT DOCUMENTS

| | | |
|---|---|---|
| 5,775,229 A | 7/1998 | Folk et al. |
| 5,777,413 A | 7/1998 | Nagata et al. |
| 5,784,267 A | 7/1998 | Koenig et al. |
| 5,785,137 A | 7/1998 | Reuyl |
| 5,793,137 A | 8/1998 | Smith |
| 5,799,484 A | 9/1998 | Nims |
| 5,801,454 A | 9/1998 | Leininger |
| 5,806,959 A | 9/1998 | Adams et al. |
| 5,833,211 A | 11/1998 | Berling |
| 5,833,440 A | 11/1998 | Berling |
| 5,838,085 A | 11/1998 | Roesel, Jr. et al. |
| 5,838,138 A | 11/1998 | Henty |
| 5,839,508 A | 11/1998 | Tubel et al. |
| 5,844,342 A | 12/1998 | Miyatani et al. |
| 5,844,385 A | 12/1998 | Jones et al. |
| 5,850,111 A | 12/1998 | Haaland |
| 5,850,138 A | 12/1998 | Adams et al. |
| 5,850,732 A | 12/1998 | Willis et al. |
| 5,867,004 A | 2/1999 | Drager et al. |
| 5,874,797 A | 2/1999 | Pinkerton |
| 5,886,450 A | 3/1999 | Kuehnle |
| 5,889,348 A | 3/1999 | Muhlberger et al. |
| 5,892,311 A | 4/1999 | Hayasaka |
| 5,893,343 A | 4/1999 | Rigazzi |
| 5,903,113 A | 5/1999 | Yamada et al. |
| 5,912,522 A | 6/1999 | Rivera |
| 5,923,111 A | 7/1999 | Eno et al. |
| 5,939,813 A | 8/1999 | Schöb |
| 5,942,829 A | 8/1999 | Huynh |
| 5,945,766 A | 8/1999 | Kim et al. |
| 5,952,756 A | 9/1999 | Hsu et al. |
| 5,968,680 A | 10/1999 | Wolfe et al. |
| 5,973,436 A | 10/1999 | Mitcham |
| 5,982,070 A | 11/1999 | Caamano |
| 5,982,074 A | 11/1999 | Smith et al. |
| 5,990,590 A | 11/1999 | Roesel, Jr. et al. |
| 5,997,252 A | 12/1999 | Miller |
| 5,998,902 A | 12/1999 | Sleder, Sr. et al. |
| 6,002,192 A | 12/1999 | Krivospitski et al. |
| 6,014,015 A | 1/2000 | Thorne et al. |
| 6,020,711 A | 2/2000 | Rubertus et al. |
| 6,027,429 A | 2/2000 | Daniels |
| 6,032,459 A | 3/2000 | Skowronski |
| 6,034,463 A | 3/2000 | Hansson |
| 6,037,672 A | 3/2000 | Grewe |
| 6,037,696 A | 3/2000 | Sromin et al. |
| 6,043,579 A | 3/2000 | Hill |
| 6,047,104 A | 4/2000 | Cheng |
| 6,055,163 A | 4/2000 | Wagner et al. |
| 6,057,622 A | 5/2000 | Hsu |
| 6,062,016 A | 5/2000 | Edelman |
| 6,064,122 A | 5/2000 | McConnell |
| 6,065,281 A | 5/2000 | Shekleton et al. |
| 6,066,898 A | 5/2000 | Jensen |
| 6,066,906 A | 5/2000 | Kalsi |
| 6,081,053 A | 6/2000 | Maegawa et al. |
| 6,082,112 A | 7/2000 | Shekleton |
| 6,086,250 A | 7/2000 | Rouhet et al. |
| 6,087,750 A | 7/2000 | Raad |
| 6,093,293 A | 7/2000 | Haag et al. |
| 6,093,986 A | 7/2000 | Windhorn |
| 6,097,104 A | 8/2000 | Russell |
| 6,100,809 A | 8/2000 | Novoselsky et al. |
| 6,104,097 A | 8/2000 | Lehoczky |
| 6,104,115 A | 8/2000 | Offringa et al. |
| 6,105,630 A | 8/2000 | Braun et al. |
| 6,109,222 A | 8/2000 | Glezer et al. |
| 6,125,625 A | 10/2000 | Lipinski et al. |
| 6,127,758 A | 10/2000 | Murry et al. |
| 6,149,410 A | 11/2000 | Cooper |
| 6,157,107 A | 12/2000 | Aoshima et al. |
| 6,158,953 A | 12/2000 | Lamont |
| 6,166,473 A | 12/2000 | Hayasaka |
| 6,169,332 B1 | 1/2001 | Taylor et al. |
| 6,170,251 B1 | 1/2001 | Skowronski et al. |
| 6,172,429 B1 | 1/2001 | Russell |
| 6,172,440 B1 | 1/2001 | Sasaki et al. |
| 6,175,210 B1 | 1/2001 | Schwartz et al. |
| 6,177,735 B1 | 1/2001 | Chapman et al. |
| 6,178,751 B1 | 1/2001 | Shekleton et al. |
| 6,181,235 B1 | 1/2001 | Smith |
| 6,189,621 B1 | 2/2001 | Vail, III |
| 6,191,561 B1 | 2/2001 | Bartel |
| 6,194,802 B1 | 2/2001 | Rao |
| 6,195,869 B1 | 3/2001 | Pullen et al. |
| 6,198,174 B1 | 3/2001 | Nims et al. |
| 6,199,381 B1 | 3/2001 | Unger et al. |
| 6,199,519 B1 | 3/2001 | Van Blarigan |
| 6,211,633 B1 | 4/2001 | Jones et al. |
| 6,215,206 B1 | 4/2001 | Chitayat |
| 6,218,760 B1 | 4/2001 | Sakuragi et al. |
| 6,226,990 B1 | 5/2001 | Conrad |
| 6,242,827 B1 | 6/2001 | Wolf et al. |
| 6,242,840 B1 | 6/2001 | Denk et al. |
| 6,244,034 B1 | 6/2001 | Taylor et al. |
| 6,246,138 B1 | 6/2001 | Nims |
| 6,255,743 B1 | 7/2001 | Pinkerton et al. |
| 6,269,639 B1 | 8/2001 | Conrad |
| 6,269,640 B1 | 8/2001 | Conrad |
| 6,274,945 B1 | 8/2001 | Gilbreth et al. |
| 6,274,960 B1 | 8/2001 | Sakai et al. |
| 6,275,012 B1 | 8/2001 | Jabaji |
| 6,276,124 B1 | 8/2001 | Soh et al. |
| 6,279,318 B1 | 8/2001 | Conrad |
| 6,279,319 B1 | 8/2001 | Conrad |
| 6,284,106 B1 | 9/2001 | Haag et al. |
| 6,286,310 B1 | 9/2001 | Conrad |
| 6,288,467 B1 | 9/2001 | Lange et al. |
| 6,291,901 B1 | 9/2001 | Ćefo |
| 6,293,101 B1 | 9/2001 | Conrad |
| 6,294,842 B1 | 9/2001 | Skowronski |
| 6,297,977 B1 | 10/2001 | Huggett et al. |
| 6,300,689 B1 | 10/2001 | Smalser |
| 6,307,278 B1 | 10/2001 | Nims et al. |
| 6,307,717 B1 | 10/2001 | Jeong |
| 6,309,268 B1 | 10/2001 | Mabru |
| 6,311,490 B1 | 11/2001 | Conrad |
| 6,311,491 B1 | 11/2001 | Conrad |
| 6,314,773 B1 | 11/2001 | Miller et al. |
| 6,332,319 B1 | 12/2001 | Conrad |
| 6,336,326 B1 | 1/2002 | Conrad |
| 6,339,271 B1 | 1/2002 | Noble et al. |
| 6,345,666 B1 | 2/2002 | Conrad |
| 6,348,683 B1 | 2/2002 | Verghese et al. |
| 6,362,718 B1 | 3/2002 | Patrick et al. |
| 6,363,706 B1 | 4/2002 | Meister et al. |
| 6,370,928 B1 | 4/2002 | Chies et al. |
| 6,373,162 B1 | 4/2002 | Liang et al. |
| 6,373,230 B2 | 4/2002 | Jabaji |
| 6,380,648 B1 | 4/2002 | Hsu |
| 6,384,564 B1 | 5/2002 | Pollock |
| 6,397,946 B1 | 6/2002 | Vail, III |
| 6,405,522 B1 | 6/2002 | Pont et al. |
| 6,407,465 B1 | 6/2002 | Peltz et al. |
| 6,411,003 B1 | 6/2002 | Sasaki et al. |
| 6,435,925 B1 | 8/2002 | Mabru |
| 6,438,937 B1 | 8/2002 | Pont et al. |
| 6,445,105 B1 | 9/2002 | Kliman et al. |
| 6,453,658 B1 | 9/2002 | Willis et al. |
| 6,454,920 B1 | 9/2002 | Haag et al. |
| 6,455,964 B1 | 9/2002 | Nims |
| 6,455,970 B1 | 9/2002 | Shäfer et al. |
| 6,463,730 B1 | 10/2002 | Keller et al. |
| 6,467,725 B1 | 10/2002 | Coles et al. |
| 6,470,933 B1 | 10/2002 | Volpi |
| 6,479,534 B1 | 11/2002 | Bentley et al. |
| 6,483,222 B2 | 11/2002 | Pelrine et al. |
| 6,486,640 B2 | 11/2002 | Adams |
| 6,503,056 B2 | 1/2003 | Eccles et al. |
| 6,504,281 B1 | 1/2003 | Smith et al. |
| 6,512,305 B1 | 1/2003 | Pinkerton et al. |
| 6,518,680 B2 | 2/2003 | McDavid, Jr. |
| 6,526,757 B2 | 3/2003 | Mackay |
| 6,531,799 B1 | 3/2003 | Miller |

(56) References Cited

U.S. PATENT DOCUMENTS

| | | |
|---|---|---|
| 6,538,358 B1 | 3/2003 | Krefta et al. |
| 6,541,887 B2 * | 4/2003 | Kawamura ............ B60K 6/26 310/181 |
| 6,545,373 B1 | 4/2003 | Andres et al. |
| 6,546,769 B2 | 4/2003 | Miller et al. |
| 6,548,925 B2 | 4/2003 | Noble et al. |
| 6,565,243 B1 | 5/2003 | Cheung |
| 6,566,764 B2 | 5/2003 | Rebsdorf et al. |
| 6,579,137 B2 | 6/2003 | Mabru |
| 6,590,298 B1 | 7/2003 | Du Plessis |
| 6,606,864 B2 | 8/2003 | MacKay |
| 6,622,487 B2 | 9/2003 | Jones |
| 6,631,080 B2 | 10/2003 | Trimble et al. |
| 6,634,176 B2 | 10/2003 | Rouse et al. |
| 6,644,027 B1 | 11/2003 | Kelly |
| 6,647,716 B2 | 11/2003 | Boyd |
| 6,655,341 B2 | 12/2003 | Westerbeke, Jr. |
| 6,657,348 B2 | 12/2003 | Qin et al. |
| 6,664,688 B2 | 12/2003 | Naito et al. |
| 6,666,027 B1 | 12/2003 | Cardenas, Jr. |
| 6,669,416 B2 | 12/2003 | Klement |
| 6,672,413 B2 | 1/2004 | Moore et al. |
| 6,675,583 B2 | 1/2004 | Willis et al. |
| 6,677,685 B2 | 1/2004 | Pfleger et al. |
| 6,679,977 B2 | 1/2004 | Haag et al. |
| 6,684,642 B2 | 2/2004 | Willis et al. |
| 6,700,217 B1 | 3/2004 | North et al. |
| 6,700,248 B2 | 3/2004 | Long |
| 6,702,404 B2 | 3/2004 | Anwar et al. |
| 6,703,719 B1 | 3/2004 | McConnell |
| 6,703,747 B2 * | 3/2004 | Kawamura ............ H02K 11/33 310/179 |
| 6,704,993 B2 | 3/2004 | Fogarty |
| 6,710,469 B2 | 3/2004 | McDavid, Jr. |
| 6,710,491 B2 | 3/2004 | Wu et al. |
| 6,710,492 B2 | 3/2004 | Minagawa |
| 6,710,502 B2 | 3/2004 | Maslov et al. |
| 6,713,936 B2 | 3/2004 | Lee |
| 6,717,313 B1 | 4/2004 | Bae |
| 6,720,688 B1 | 4/2004 | Schiller |
| 6,724,115 B2 | 4/2004 | Kusase |
| 6,727,632 B2 | 4/2004 | Kusase |
| 6,732,531 B2 | 5/2004 | Dickey |
| 6,735,953 B1 | 5/2004 | Wolfe et al. |
| 6,737,829 B2 | 5/2004 | Sastry |
| 6,741,010 B2 | 5/2004 | Wilkin |
| 6,756,719 B1 | 6/2004 | Chiu |
| 6,759,775 B2 | 7/2004 | Grimm |
| 6,765,307 B2 | 7/2004 | Gerber et al. |
| 6,766,647 B2 | 7/2004 | Hartzheim |
| 6,771,000 B2 | 8/2004 | Kim et al. |
| 6,803,696 B2 | 10/2004 | Chen |
| 6,894,455 B2 | 5/2005 | Cai et al. |
| 6,897,595 B1 | 5/2005 | Chiarenza |
| 7,002,259 B2 | 2/2006 | Howes et al. |
| 7,081,696 B2 * | 7/2006 | Ritchey ............... H02K 7/108 310/112 |
| 7,102,248 B2 | 9/2006 | Wobben |
| 7,250,702 B2 | 7/2007 | Abou Akar et al. |
| 7,348,764 B2 | 3/2008 | Stewart et al. |
| 7,400,077 B2 | 7/2008 | Caroon |
| 7,439,714 B2 | 10/2008 | Llorente Gonzalez et al. |
| 7,446,435 B2 | 11/2008 | Zhang et al. |
| 7,514,834 B2 | 4/2009 | Takeuchi |
| 7,595,574 B2 * | 9/2009 | Ritchey ............... H02K 7/108 310/100 |
| 7,649,274 B2 | 1/2010 | Burt |
| 8,106,563 B2 * | 1/2012 | Ritchey ............... H02K 16/00 310/112 |
| 8,212,445 B2 * | 7/2012 | Ritchey ............... H02K 7/108 310/112 |
| 8,614,529 B2 * | 12/2013 | Ritchey ............... H02K 7/108 310/114 |
| 2002/0047418 A1 | 4/2002 | Seguchi et al. |
| 2002/0057030 A1 | 5/2002 | Fogarty |
| 2004/0232796 A1 | 11/2004 | Weissensteiner |
| 2004/0251761 A1 | 12/2004 | Hirzel |
| 2005/0280264 A1 | 12/2005 | Nagy |
| 2008/0088200 A1 | 4/2008 | Ritchey |
| 2010/0019593 A1 | 1/2010 | Ritchey |

FOREIGN PATENT DOCUMENTS

| | | |
|---|---|---|
| JP | 54-159641 A | 12/1979 |
| JP | 57-98015 A | 6/1982 |
| JP | 2001-161098 A | 6/2001 |
| WO | 2008/007782 A1 | 1/2008 |
| WO | 2008/091035 A1 | 7/2008 |

OTHER PUBLICATIONS

International Search Report, for International Application No. PCT/CA2007/001040, mailed Sep. 28, 2007, 2 pages.
Written Opinion of the International Searching Authority, for International Application No. PCT/CA2007/001040, mailed Sep. 28, 2007, 6 pages.

* cited by examiner

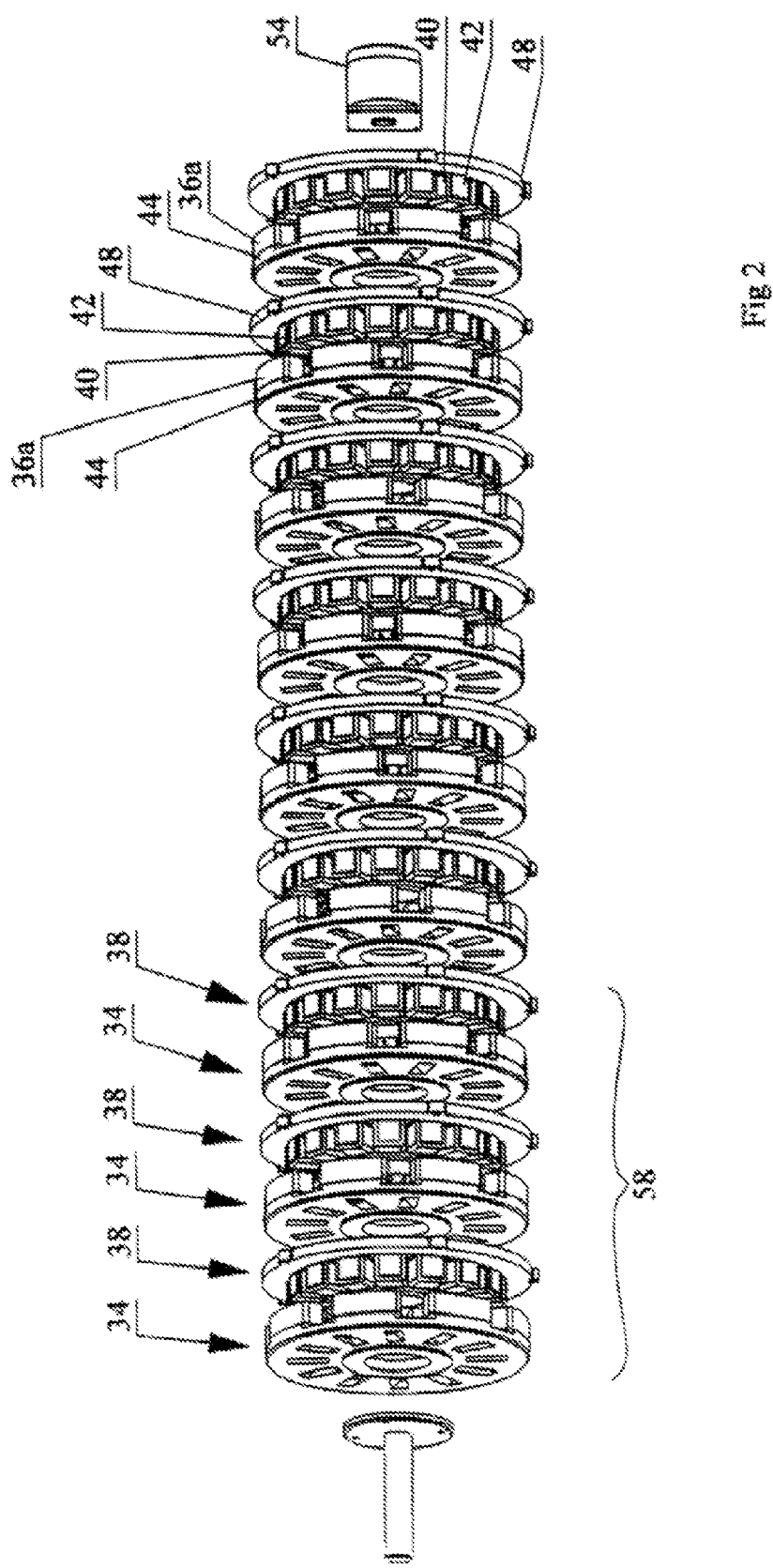

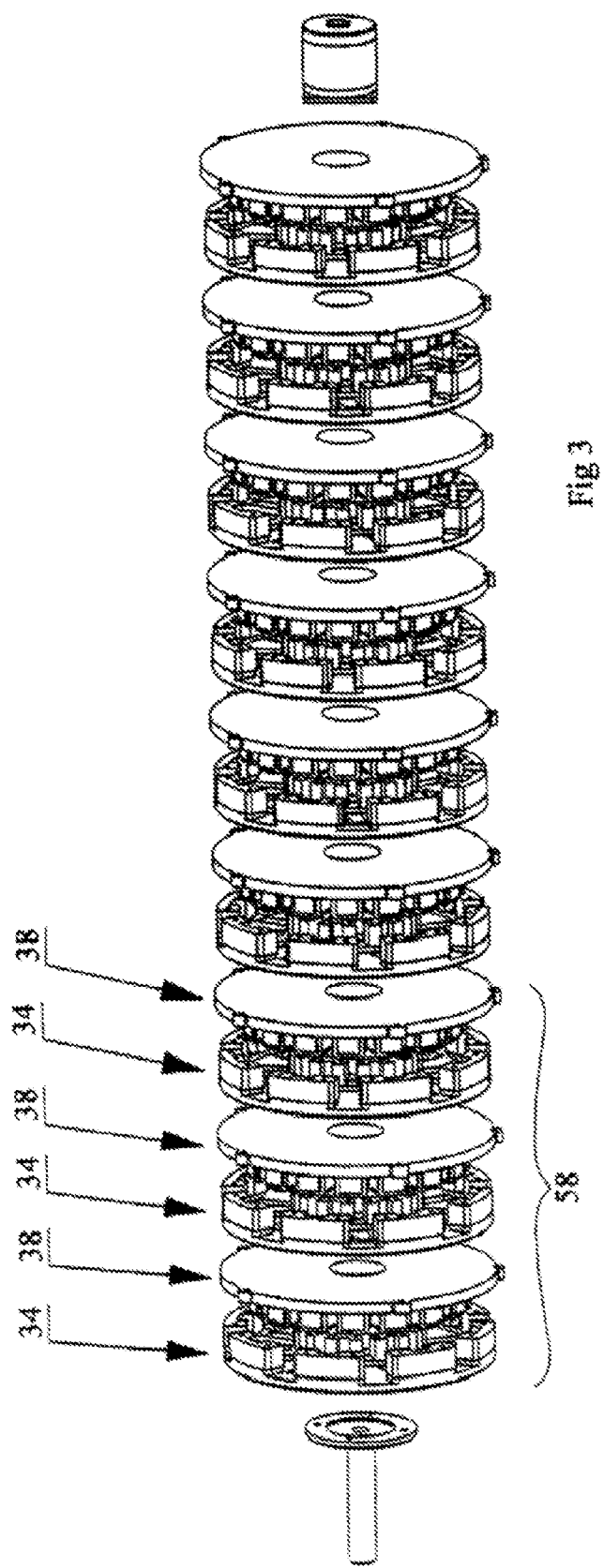

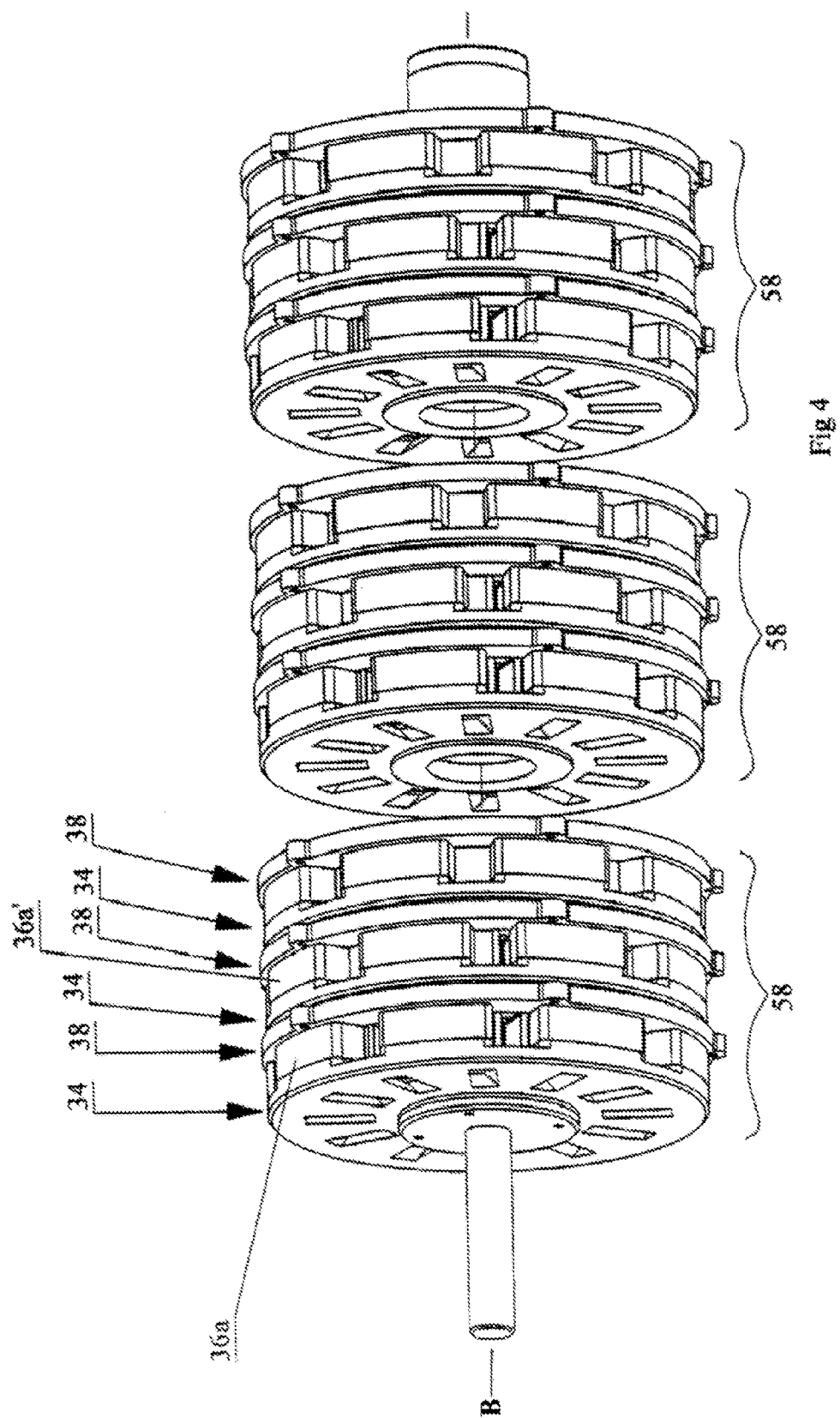

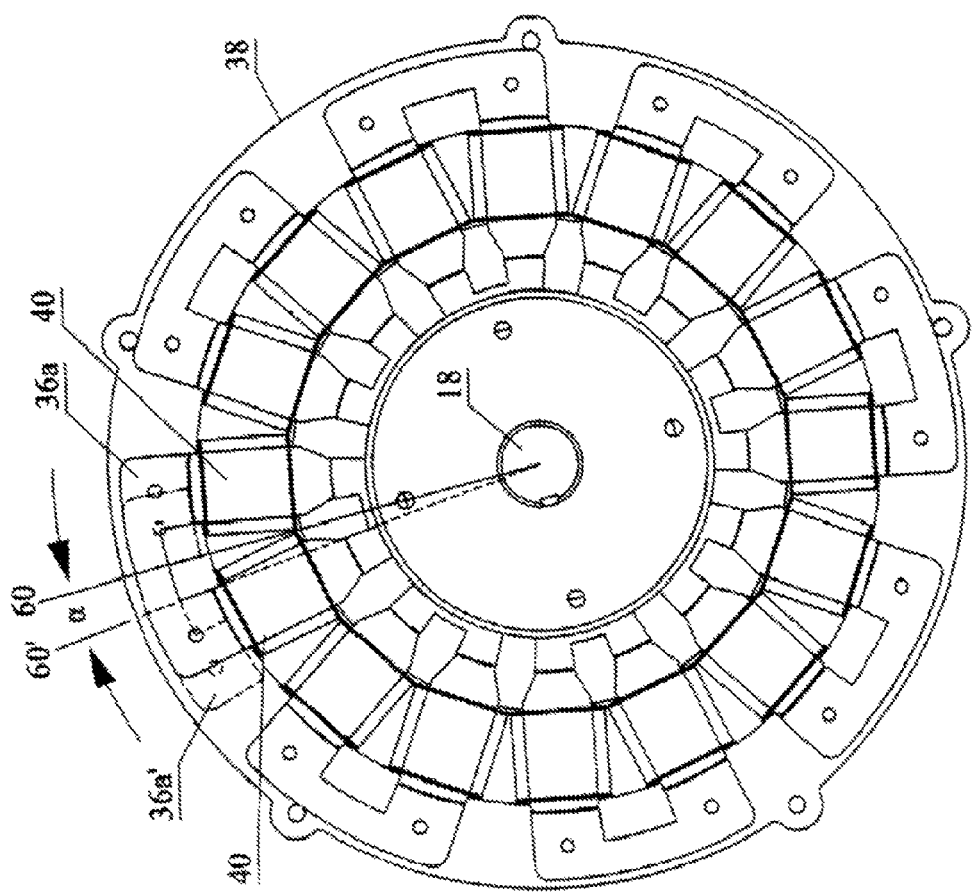

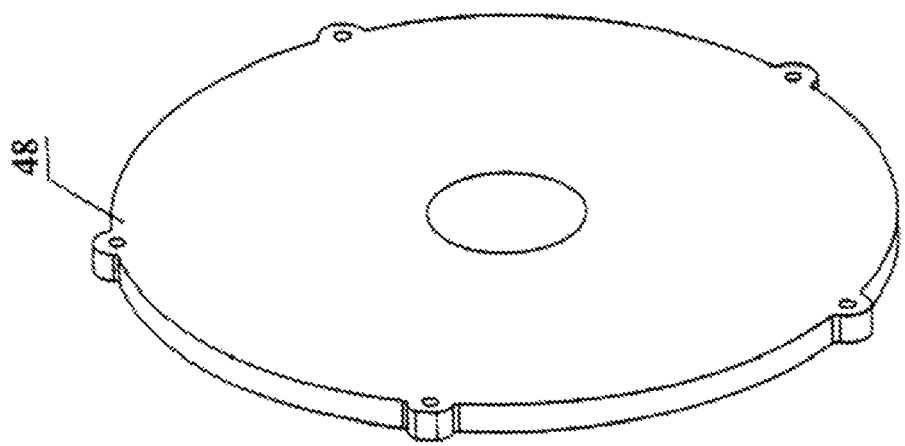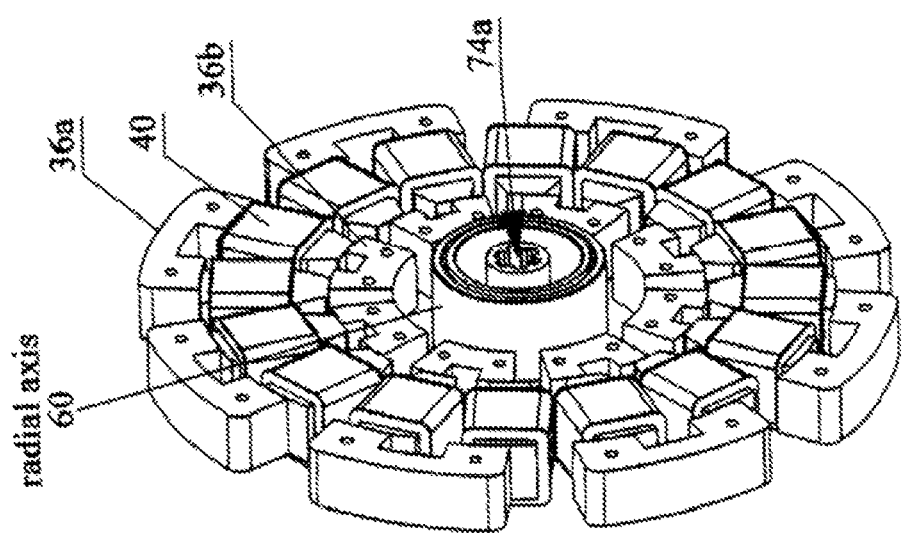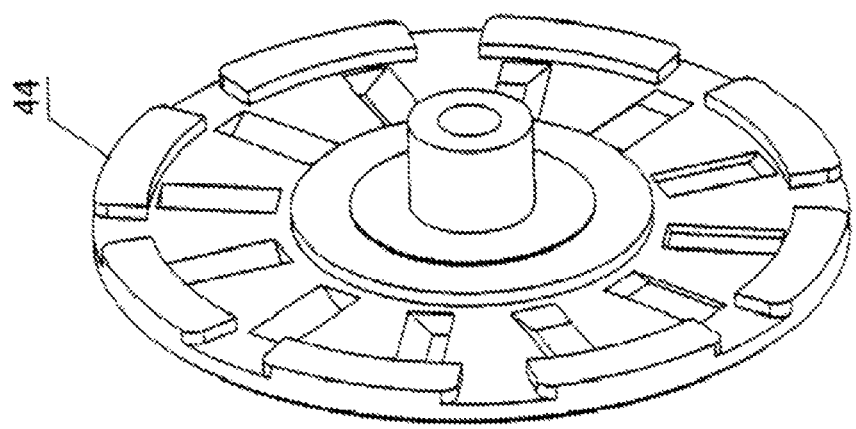
Fig. 8

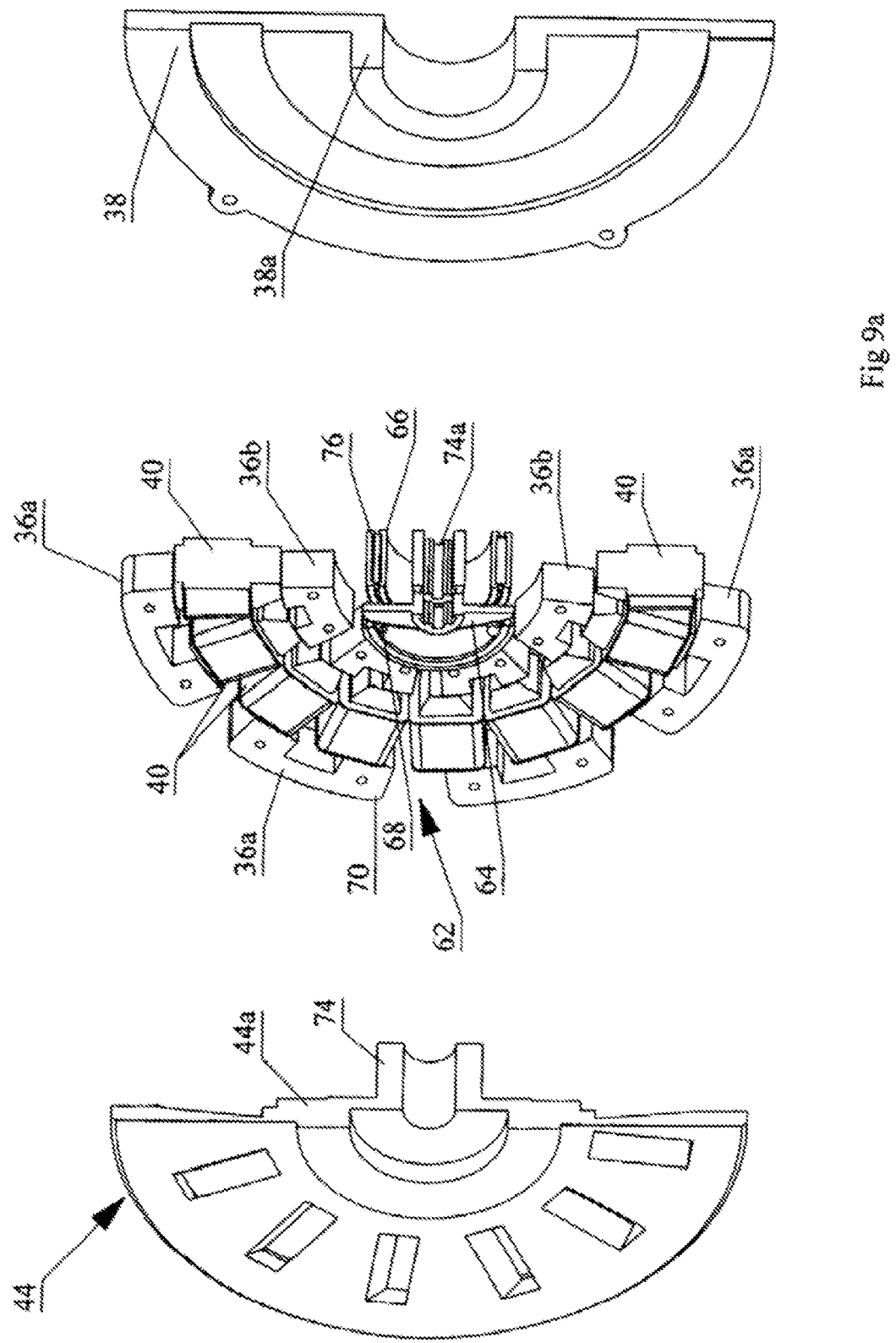

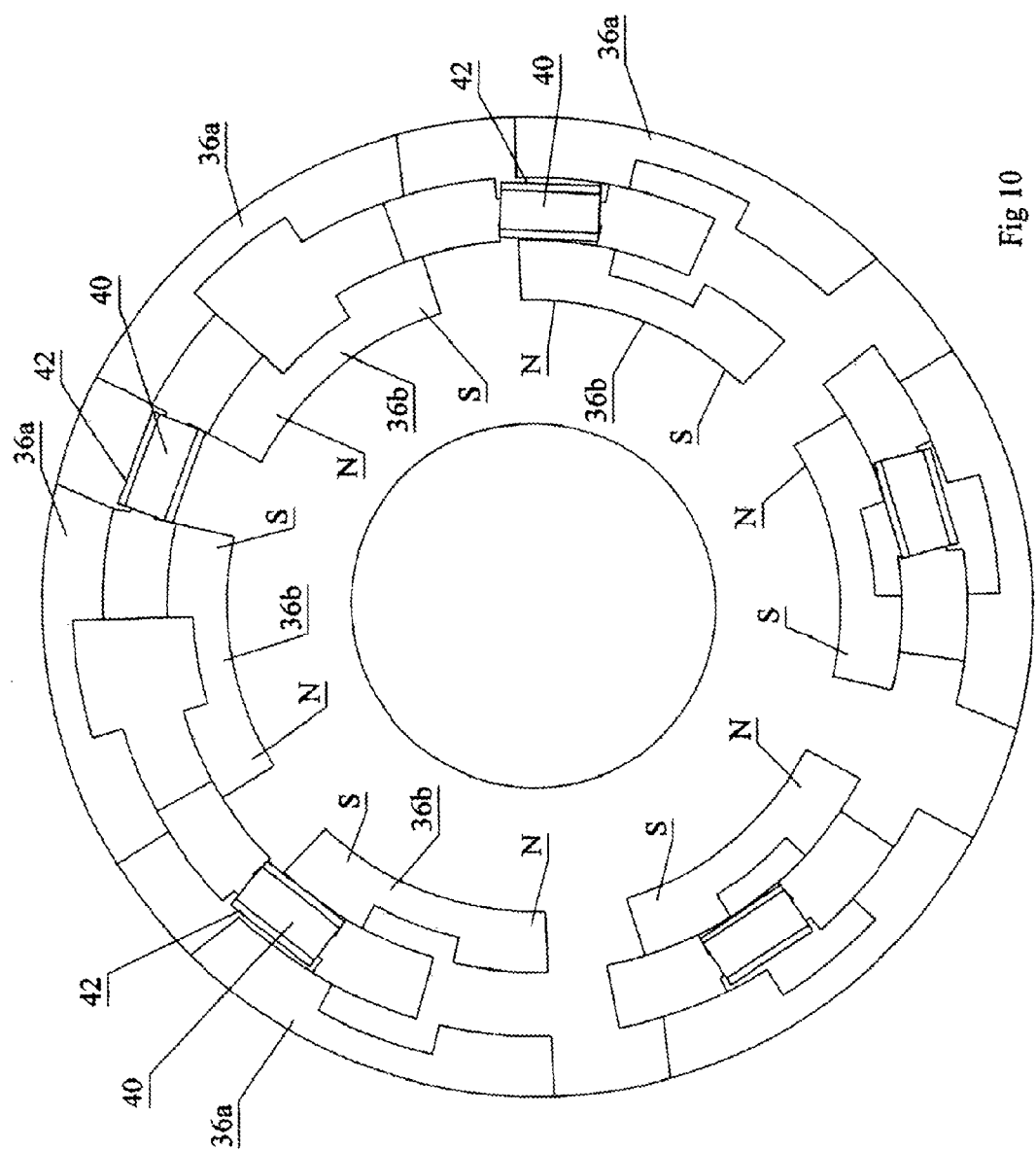

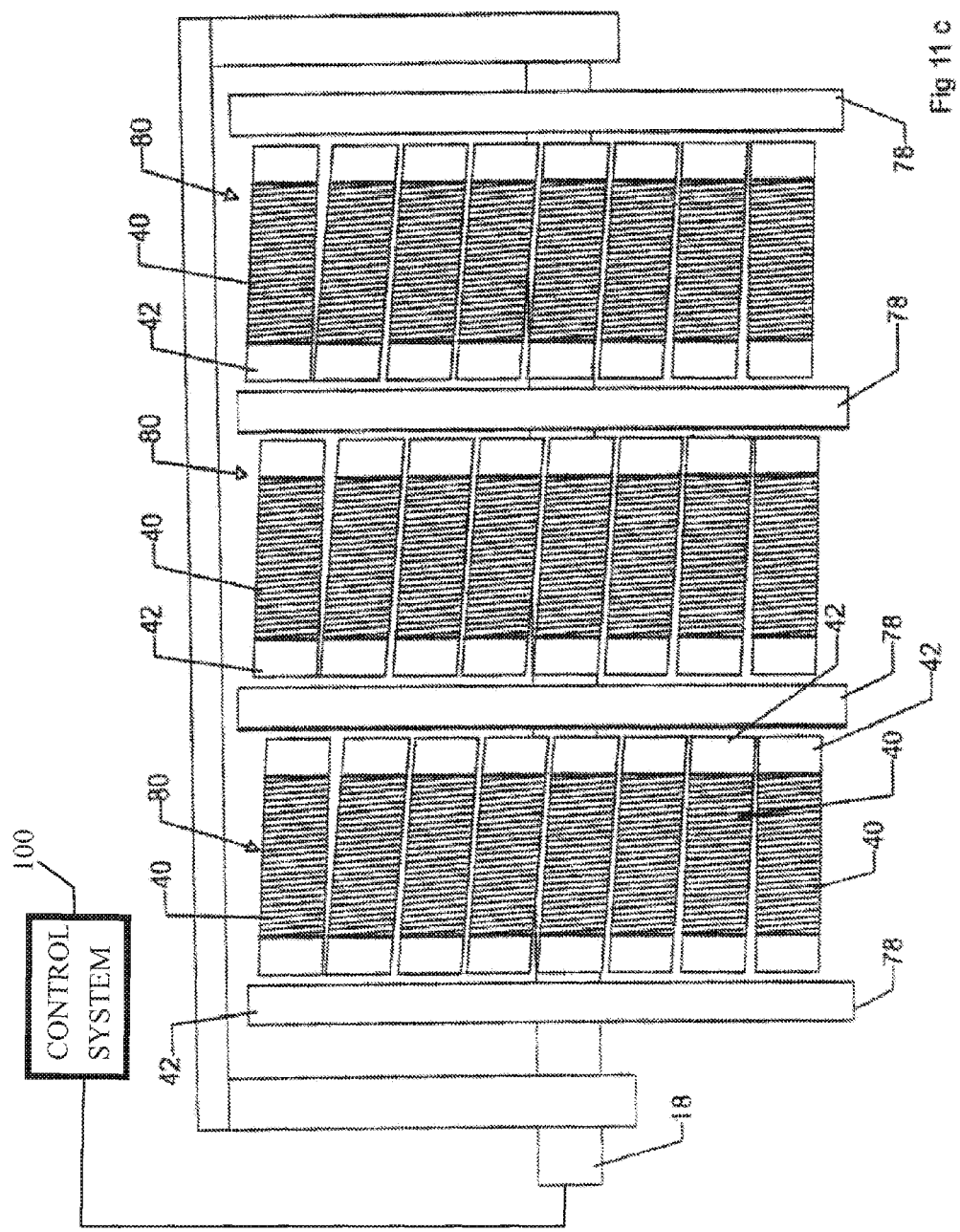

POLYPHASIC MULTI-COIL GENERATOR

RELATED APPLICATIONS

This application is a Continuation of U.S. patent application Ser. No. 11/760,704 filed on Jun. 8, 2007, entitled POLYPHASIC MULTI-COIL GENERATOR, which claims the priority date of U.S. Provisional patent application No. 60/804,279 filed on. Jun. 8, 2006, entitled POLY-PHASIC MULTI-COIL GENERATOR.

BACKGROUND OF THE INVENTION

1. Field of the Invention

The present invention relates to the field of generators, and more particularly, it relates to a generator having polyphasic multiple coils in staged staggered arrays.

2. Background of the Invention

Conventional electric motors employ magnetic forces to produce either rotational or linear motion. Electric motors operate on the principle that when a conductor, which carries a current, is located in the magnetic field, a magnetic force is exerted upon the conductor resulting in movement. Conventional generators operate through the movement of magnetic fields thereby producing a current in a conductor situated within the magnetic fields. As a result of the relationship between conventional motors and generators, conventional generator technologies have focused mainly on modifying electric motor designs, for example, by reversing the operation of an electric motor.

In a conventional design for an electric motor, adding an electrical current to the coils of an induction system creates a force through the interaction of the magnetic fields and the conducting wire. The force rotates a shaft. Conventional electric generator design is the opposite. By rotating the shaft, an electric current is created in the conductor coils. However the electric current will continue to oppose the force rotating the shaft. This resistance will continue to grow as the speed of the shaft is increased, thus reducing the efficiency of the generator. In a generator where a wire is coiled around a soft iron core (ferromagnetic), a magnet may be drawn by the coil and a current will be produced in the coil wire. However, the system would not create an efficient generator due to the physical reality that it takes more energy to pull the magnet away from the soft iron core of the coil than would be created in the form of electricity by the passing of the magnet.

As a result, there is a need for a generator wherein the magnetic drag may be substantially reduced such that there is little resistance while the magnets are being drawn away from the coils. Furthermore, there is a need for a generator that minimizes the impact of the magnetic drag produced on the generator. In the prior art, Applicant is aware of U.S. Pat. No. 4,879,484 which issued to Huss on Nov. 7, 1989 for an Alternating Current Generator and Method of Angularly Adjusting the Relative Positions of Rotors Thereof. Huss describes an actuator for angularly adjusting a pair of rotors relative to each other about a common axis, the invention being described as solving a problem with voltage control as generator load varies where the output voltage of a dual permanent magnet generator is described as being controlled by shifting the two rotors in and out of phase.

Applicant also is aware of U.S. Pat. No. 4,535,263 which issued Aug. 13, 1985 to Avery for Electric D.C. Motors with a Plurality of Units, Each Including a Permanent Magnet Field Device and a Wound Armature for Producing Poles. In that reference, Avery discloses an electric motor having spaced stators enclosing respective rotors on a common shaft wherein circumferential, spaced permanent magnets are mounted on the rotors and the stator windings are angularly offset with respect to adjacent stators slots so that cogging that occurs as the magnets pass a stator slot are out of phase and thus substantially cancelled out.

Applicant is also aware of U.S. Pat. No. 4,477,745 which issued to Lux on Oct. 6, 1984 for a Disc Rotor Permanent Magnet Generator. Lux discloses mounting an array of magnets on a rotor so as to pass the magnets between inner and outer stator coils. The inner and outer stators each have a plurality of coils so that for each revolution of the rotor more magnets pass by more coils than in what are described, as standard prior art generators having only an outer coil-carrying stator with fewer, more spaced apart magnets.

Applicant is also aware of U.S. Pat. No. 4,305,031 which issued Wharton on Dec. 8, 1981 for a Rotary Electrical Machine. Wharton purports to address the problem wherein a generator's use of permanent magnet rotors gives rise to difficulties in regulating output voltage under varying external load and shaft speed and so describes a servo control of the relative positions of the permanent magnets by providing a rotor having a plurality of first circumferentially spaced permanent magnet pole pieces and a plurality of second circumferentially spaced permanent magnet pole pieces, where the servo causes relative movement between the first and second pole pieces, a stator winding surrounding the rotor.

Furthermore, while existing generator systems are relatively efficient at converting mechanical to electrical energy, these existing systems have a narrow "efficient" operational range, and lack the specific power density required to maximize usefulness for many applications. Existing systems have only one "sweet spot" or one mode of efficient operation. As a result, these technologies are challenged to convert mechanical energy to electrical energy efficiently when the prime-mover energy source is continuously changing.

The "sweet spot" for many typical systems is about 1800 rpm. At this speed the generator can efficiently process kinetic energy into electricity, but at speeds outside this optimal range these systems cannot adapt and therefore either the energy collection system (i.e., turbine) or signal processing circuitry must compensate. The methods for compensation are many, and may simply be the turning of turbine blades away from the wind (furling or pitching) to slow the rotor, or gearing mechanisms to compensate when wind speeds are below the generators optimal operating range. These methods all waste energy in an effort to match a constantly changing energy source with a generator looking for a predictable and constant prime-mover.

Therefore these conventional generators have an inability to maintain a high coefficient of performance due to a limited operating range. Extensive efforts have been made to expand the turbine's ability to cope with excessive energy (when wind energy exceeds the threshold) through mechanical shedding of energy (i.e., wasted output). Conversely, in those cases where input energy is below the threshold, current generators either fail to operate, or they operate inefficiently (i.e., wasted input). Most of the efforts to date have focused on either mechanical input buffers (gear boxes) or electronic output buffers (controls), but the cost has been high, both in terms of development costs & complexities as well as inefficiencies and increased operations costs.

SUMMARY OF THE INVENTION

As a result, there is a need for an adaptable generator system with more than a single "sweet spot". This system would be able to match prime-mover and load so as to increase the efficiency of power generation in environments where either the source energy is changing or the load requirement is changing.

The applicant is aware of industry's attempts to create a generator with more than one "sweet spot". For example, the WindMatic systems (http://www.solardyne.com/win15swinfar.html) utilize two separate generators in an attempt to capture a broader range of wind speeds. While this dual generator design does prove to broaden the band of operation, the overall output for a given weight would be lower than the disclosed Poly-Phasic Multi-Coil Generator (PPMCG). The PPMCG essentially combines a multitude of generators (18 for example) in a single unit rather than requiring two separate generators to allow only two separate sweet spots. In addition, for the WindMatic system these two generator systems are combined and controlled through additional gearing and hardware. Therefore, the design utilizing two separate generators would have additional construction/material costs as well as additional maintenance costs over the PPMCG design.

For many applications, the weight to output of the generator is of utmost importance. Increasing the Specific Power Density of a generator has been an ongoing and primary focus for generator designers. The proposed generator addresses this issue through a unique design characteristic called "Closed Flux Path induction".

Closed Flux Path Induction (CFPI) technology is possible in the Poly-Phasic Multi-Coil Generator (PPMCG) design due to the unique internal geometry with respect to the magnetic influences and induction coils. The result is reduced flux leakage and a more efficient induction process over conventional systems.

It is well known that the strength of the magnetic field (flux density) in a generator system determines the magnitude of the electrical output. Therefore the optimal system would ensure the strongest field density at the induction coil poles while minimizing straying magnetic fields (flux leakage) that creates unwanted currents in various generator components wasting energy in the form of heat and straying electrical currents. These issues are addressed with the disclosed generator system as it maximizes flux density where it is desired while at the same time reducing unwanted flux leakage.

Closed Flux Path Induction provides a path of high magnetic permeability for the flux lines to travel. A common example of a closed flux path is a simple horseshoe magnet with a keeper. The keeper acts to close the path for the magnetic field as it moves from one magnetic pole to the other.

Magnets have a diffuse magnetic field that permeates their immediate surroundings. The flux lines that leave one pole MUST return to the opposite pole. The effective magnetic field induced by a flux line depends on the path that it follows. If it must cover a large distance through a medium of low magnetic permeability (air) it will be a relatively weak field. If the flux line can pass through a material of high magnetic permeability (ferromagnetic materials) a stronger field is produced and less leakage will occur.

As an example, a small button magnet can easily pick up a paperclip if it is held close to it but, if held at a distance equal to the paperclips length there will be little effect because the permeability of air is very low. If a paperclip is placed between the magnet and another paperclip, both paperclips may be picked up. The first paper clip acts as a path of high permeability for the magnet effectively increasing the strength of the magnetic field at a distance.

The strength of a horseshoe magnet arises from this effect. When you pick up a piece of metal with a horseshoe magnet it completes the magnetic path by connecting the North and South poles with a material of high magnetic permeability. A secondary effect of providing a path of high permeability is that the flux leakage is reduced.

Flux leakage is defined as the undesirable magnetic field. That is, the magnetic field that is not focused on the desired object (the induction coil in a generator). Flux leakage is problematic for generators because it results in less magnetic field strength where it is desired, at the induction coil poles, and it generates unwanted effects such as eddy currents that reduce the systems efficiency.

Conventional generators have attempted to deal with the above issues by utilizing high permeability materials as cases or end caps so that the large magnetic fields generated can be utilized efficiently. Unfortunately, materials with high permeability are also quite heavy and reduce the power to weight ratio of the generator significantly. In addition, these systems have not been successful in a completely isolated and controlled induction process as is the case with the PPMCG.

Many conventional electromagnetic induction generator systems utilize excitation systems as a current is required to excite the electromagnets in order to create the necessary magnetic field. This is often done with another smaller generator attached to the same rotor as the primary system such that as the rotor turns, a current is created in the primary system's electromagnets. There are other systems that utilize electrical storage systems to create the initial required charge. These systems are not as efficient as a permanent magnet system as a certain amount of the output power created by the generator is required to be fed back into its own electromagnets in order to function, thus reducing efficiency. In addition, a PM system offers more field strength per weight than electromagnetic systems. Unfortunately, permanent magnets get more difficult to work with as generators get larger, and larger systems in the megawatt range are almost all electromagnetic induction systems. The PPMCG system offers the benefits of both a PM machine and an electromagnetic excitation "induction" generator through the use of a hybrid magnetic system.

Hybrid magnets can also be utilized in the PPMCG to further increase the strength of the magnetic field beyond the strength of just the permanent magnet. This hybrid magnet is an electromagnet with a permanent magnet imbedded into it in such a way as to maximize field strength and controllability over the field.

Because Voltage is dependent upon the length of a conductor that passes through a magnetic field, selecting the total conductor length of each phase selects the voltage. With the unique PPMCG design the generator may be easily modified to act as various systems with different voltage outputs. The pins or other electrical contacts may be disposed around the casing in a manner that allows the user or manufacture to select the operating voltage of the motor or generator by connecting adjacent layers in a selected angular orientation with respect to each other. An orientation may be selected, such as to allow the operator to determine the resultant voltage being created, if it is acting as a generator, or the appropriate input voltage, if it is acting as a motor. For example, the same machine may run at 120 volts, 240 volts or 480 volts.

Conventional generator systems utilize a post-processing power electronics system that creates a sub-standard power signal and then attempts to "fix" it through manipulating other system parameters such as modifying the turbine blade pitch, or changing gearing ratios that drive the rotor. This post-processing practice that attempts to fix a signal after it is created lacks efficiency and often leads to the need for asynchronous function where the output is converted into DC and then back again to AC in order to be synchronous with the grid. This is an inefficient process where substantial losses are incurred in the inversion process.

As a result, there is a need for a more functional processing system. The PPMCG "Pre-Processing" power electronics is a key element to the PPMCG system. It allows the significant advantage of creating the desired output signal in raw form rather than creating an inadequate signal and then trying to fix it with conventional "post-processing" electronics. The PPMCG generator stages are monitored by the "Pre-Signal" Processing circuit, which allows the device to harmonize output voltage and system resistance with grid requirements, simultaneously through adding and removing independent generator stages. While the staging system offers a course control, the electronics system offers the fine control required to ensure grid tolerances are met and seamless integration is achieved. Various mechanisms can be employed to ensure smooth fine control as stages are added or removed from the system. One such mechanism would be a pulse wave modulator that pulses in and out the stages while maintaining the desire generator operation.

The current from each stage of the system is monitored by the pre-signal processing circuit that determines what system configuration is most beneficial based upon readily available information. When the turbine (prime-mover) reaches adequate momentum the pre-signal processing circuit will engage the first stage. Each stage is monitored and additional stages are added, or removed, by the control system depending on availability of the energy source and the current operating condition of existing engaged stages.

Another major challenge for electrical engineers is how to remove the need for a conventional gearbox. Many existing generators operate best at high speed and require step-up gearboxes. These gearboxes are expensive, subject to vibration, noise and fatigue, and require ongoing maintenance and lubrication. The negative impact of gearboxes is considerable. Perhaps more significantly, gearboxes allow the generator to function at low wind speeds but when wind speeds are low the system can least afford to waste precious wind energy.

The benefits of a direct-coupled gearbox are significant. Many conventional systems have gearbox losses up to 5% of total output. In addition the gearbox represents a costly and high maintenance component often weighing as much as the generator component. The gearbox is a weak link in the generator system that adds unwanted weight, cost, and reduces overall efficiency of the system.

In contrast to conventional designs, the PPMCG Technology is well suited to a 'direct-coupled' configuration that forgoes the gearbox and the attendant losses that impede performance. The PPMCG does not function through mechanical gearing but by applying resistance to the rotor to maintain appropriate speeds, effectively acting as its own gearbox. The required resistance at the rotor will be determined by the system electronics and will be created by engaging the appropriate number of complete generator stages. In essence, the rotor speed is controlled (up to a predetermined threshold) by the resistance created through the process of creating electrical power, unlike a mechanical system that sheds valuable energy to control the rotor rotation.

The PPMCG technology's multi-pole stator field, will allow slow speed operation such that the system could function effectively without a conventional gearbox that impedes overall system performance. With each rotation of the rotor each coil is induced 18 times (assuming 18 coils per stator). Therefore regardless of if there were 1 coil or 100 coils on the stator, each coil would still produce electricity at the same frequency as all other coils on the same stator. As each new coil is added then, a consistent output signal is created for all coils on each stator. As the three stator arrays are offset appropriately (i.e. by 120 degrees), the mechanical configuration determines that the output signal is a synchronous 3 phase signal.

In recent years, a number of alternative concepts have been proposed that remove the need for gearboxes and 'direct-couple' the turbine with the generator rotor. The challenge for these systems is that the generator still requires a constant and predictable prime mover to function efficiently. These direct-coupled generators are thus compromised due to inadequate compensation methods for controlling generator speeds. The output of an induction generator can be controlled by varying the current flow through the rotor coils. Induction generators produce power by exciting the rotor coils with a portion of the output power. By varying the current through the rotor coils the output of the generator can be controlled. This control method is called 'doubly fed' and allows the operation of induction generators as asynchronous variable speed machines. While offering some benefits over constant speed systems, this type of generator is expensive and incurs considerable losses in the process of conditioning the output.

A major limitation of existing "variable speed" generators is the additional cost and complication of power electronics. Power electronics are required to condition the output so that it is compatible with the grid and to ensure that the generator is operating at its peak efficiency. These variable speed generators work by rectifying the variable AC output of the generator to DC and then inverting it back to grid synchronized AC. This method requires the use of high power silicon (expensive) and losses are incurred in the processes of transforming and inverting the output current (i.e. AC to DC to AC).

The PPMCG technology shifts with the input source, capturing more energy at a wider range and reducing the need for mechanical interference and the wasted energy that results. Adding, or dropping, stages as input energy and load varies, the self-adapting unit reduces need for complex, expensive gearboxes and power controls.

Yet another challenge with existing systems is the fault control systems. For exiting systems the total output of the system must be managed by the power electronics at all times and when a fault occurs, the fault current is very problematic due to the limited overloading capability of the power electronic converter. For conventional systems, when a fault occurs, the system must be shut down immediately or considerable damage can occur to the generator.

A fault is defined here as a short circuit. When a short circuit occurs, the output current of synchronous generators increases substantially, because the impedance is reduced. The large current can damage equipment and should therefore be reduced as soon as possible by removing the faulted component from the system, thus cancelling the low impedance current path. However, the large current is also a clear indicator that a short circuit exists. Thus, on the one hand, the fault current is undesirable because it can lead to equipment damage while on the other hand it is an essential indicator to distinguish between faulted and normal situations.

PPMCG employs a unique and beneficial fault control mechanism. When an internal failure occurs in a PM generator, the failed winding will continue to draw energy until the generator is stopped. For high-speed generators, this may represent a long enough duration to incur further damage to electrical and mechanical components. It could also mean a safety hazard for individuals working in the vicinity. The induction generator, on the other hand, is safely shut down by de-excitation within a few milliseconds preventing hazardous situations and potential damage to the unit. In either scenario, the system must be completely shut down until it can be repaired causing unwanted downtime at potentially very inopportune times when power is needed most.

With the PPMCG Technology, dividing the output current into smaller manageable sections significantly reduces the negative impact of faults in the stator windings. Since far less current is created by the single three-coil sub-system or staged element, system faults are localized. While they still must be managed, damage can be avoided and safety issues reduced. One of the advantages of the proposed "pre-processing" circuitry is the ability to simply avoid utilizing the current from a faulty coil, while allowing the remainder of the coils to continue functioning (in fact, three coils will need to be shut down if there is a fault in a three phase system).

Another challenge for many existing systems is that they are not capable of creating a raw signal that doesn't require significant manipulation to the sine-wave form in order to match the required output frequency for grid integration. For many conventional systems "shaping" of the field core poles is simply not an available option and therefore there is no other choice but to condition the power so it is in alignment with the desired waveform.

In contrast, the PPMCG system will create the correct sinusoidal sine wave as a raw signal directly from the field coils. The sine wave created by the system can be manipulated through a unique design attribute that allows, through internal geometry, shaping of the waveform created by the generator. This is of particular relevance as the sine wave for most conventional systems required considerable conditioning in order for it to be adequately synched with grid systems. These systems must typically function as less desirable "asynchronous" machines.

Another unique and advantageous element of PPMCG is that the mass of the balanced stages of the armature disks rotate and serve to function as a flywheel. This stabilizes sudden and undesirable changes in rotational speed and smoothes out the operation of the system.

In addition to having a positive impact on renewable energy systems that utilize variant energy sources to function, the disclosed generator will also prove to offer significant value to conventional non-renewable systems. For example, many conventional systems having one state of efficient operation will utilize far more fuel than is required to meet the power needs of the consumer. With the disclosed generator system, the generator will re-configure itself so as to be the right sized generator to meet only the current needs of the consumer thus preserving fuel as power requirements are lower than the rated speed for a conventional system.

In summary, the polyphasic multi-coil generator includes a driveshaft, at least first, second, and third rotors rigidly mounted on the driveshaft so as to simultaneously synchronously rotate with rotation of the driveshaft, and at least one stator sandwiched between the first and second rotors. The stator has an aperture through which the driveshaft is rotatably journalled. A stator array on the stator has a circumferentially spaced-apart array of electrically conductive coils mounted to the stator in a first angular orientation about the driveshaft. The stator array is circumferentially spaced apart about the driveshaft and may, without intending to be limiting be equally circumferentially spaced apart. The rotors and the stator lie in substantially parallel planes. The first, second, and third rotors have, respectively, first, second, and third rotor arrays. The first rotor array has a first circumferentially spaced apart array of magnets circumferentially spaced around the driveshaft at a first angular orientation relative to the driveshaft. The second rotor array has a second equally spaced apart array of magnets at a second angular orientation relative to the driveshaft. The third rotor array has a third equally spaced apart array of magnets at a third angular orientation relative to the driveshaft. Without intending to be limiting, the rotor arrays may be equally circumferentially spaced apart. The first and second angular orientations are off-set by an angular offset so that the first and second rotor arrays are offset relative to one another. The circumferentially spaced apart stator and rotor arrays may be constructed without the symmetry of their being equally circumferentially spaced apart and still function.

The angular offset is such that, as the driveshaft and the rotors are rotated in a direction of rotation of the rotors so as to rotate relative to the stator, an attractive magnetic force of the magnets of the first rotor array attracts the magnets of the first rotor array towards corresponding next adjacent coils in the stator array which lie in the direction of rotation of the rotors so as to substantially balance with and provide a withdrawing force applied to the magnets of the second rotor array to draw the magnets of the second rotor array away from corresponding past adjacent coils in the stator array as the magnets of the second rotor array are withdrawn in the direction of rotation of the rotors away from the past adjacent coils. Similarly, as the driveshaft and the rotors are rotated in the direction of rotation of the rotors, an attractive magnetic force of the magnets of the second rotor array attracts the magnets of the second rotor array towards corresponding next adjacent coils in the stator array which lie in the direction of rotation of the rotors so as to substantially balance with and provide a withdrawing force applied to the magnets of the first rotor array to draw the magnets of the first rotor array away from corresponding past adjacent coils in the stator array as the magnets of the first rotor array are withdrawn in the direction of rotation of the rotors away from the past adjacent coils. The third rotor provides a further enhancement of the above effects.

In one embodiment, a further stator is mounted on the driveshaft, so that the driveshaft is rotatably journalled through a driveshaft aperture in the further stator. A further stator array is mounted on the further stator. The further stator array has an angular orientation about the driveshaft which, while not intending to be limiting, may be substantially the same angular orientation as the first angular orientation of the stator array of the first stator. A third rotor is mounted on the driveshaft so as to simultaneously synchronously rotate with rotation of the first and second rotors. A third rotor array is mounted on the third rotor. The third rotor array has a third equally radially spaced apart array of magnets radially spaced around the driveshaft at a third angular orientation relative to the driveshaft. The third angular orientation is angularly offset for example, by the angular offset of the first and second rotor arrays so that the third rotor array is offset relative to the second rotor array by the same angular offset as between the first and second rotor arrays. The further stator and the third rotor lay in planes substantially parallel to the substantially parallel planes the first stator and the first and second rotors. Advantageously the third rotor array is both offset by the same angular offset as between the first and second rotor arrays from the second rotor array and by twice the angular offset as between the first and second rotor arrays, that is, their angular offset multiplied by two, from the first rotor array. Thus the first, second and third rotor arrays are sequentially angularly staggered about the driveshaft.

The sequentially angularly staggered first, second and third rotors, the first stator and the further stators may be referred to as together forming a first generator stage. A plurality of such stages, that is, substantially the same as the first generator stage, may be mounted on the driveshaft. Further stages may or may not be aligned with the first stage depending upon the desired application.

The magnets in the rotor arrays may be pairs of magnets, each pair of magnets may advantageously be arranged with one magnet of the pair radially inner relative to the driveshaft and the other magnet of the pair radially outer relative to the driveshaft. This arrangement of the magnets, and depending on the relative position of the corresponding coils on the corresponding stator, provides either radial flux rotors or axial flux rotors. For example, each pair of magnets may be aligned along a common radial axis, that is, one common axis for each pair of magnets, where each radial axis extends radially outwardly of the driveshaft, and each coil in the stator array may be aligned so that the each coil is wrapped substantially symmetrically around corresponding radial axes. Thus, advantageously, the magnetic flux of the pair of magnets is orthogonally end-coupled, that is, coupled at ninety degrees to the corresponding coil as each pair of magnets are rotated past the corresponding coil. The use of coupled inner and outer magnets on the rotor array greatly increases the magnetic field density and thus increases the power output from each coil.

In one embodiment not intended to be limiting, the first rotor array is at least in part co-planar with the corresponding stator array as the first rotor array is rotated past the stator array, and the second rotor array is at least in part co-planar with the corresponding stator array as the second rotor is rotated past the stator array. The third rotor array is at least in part co-planar with the corresponding stator array as the third rotor is rotated past the stator array.

The rotors may include rotor plates wherein the rotor arrays are mounted to the rotor plates, and wherein the rotor plates are mounted orthogonally onto the driveshaft. The stators may include stator plates and the stator arrays are mounted to the stator plates, and wherein the stator plates are orthogonal to the driveshaft.

The rotors may be mounted on the driveshaft by mounting means which may include clutches mounted between each of the first and second rotors and the driveshaft. In such an embodiment, the driveshaft includes means for selectively engaging each clutch in sequence along the driveshaft by selective longitudinal translation of the driveshaft by selective translation means. The clutches may be centrifugal clutches adapted for mating engagement with the driveshaft when the driveshaft is longitudinally translated by the selective translation means into a first position for mating engagement with, firstly, a first clutch for example, although not necessarily, on the first rotor and, secondly sequentially into a second position for mating engagement with also a second clutch for example on the second rotor and so on to sequentially add load to the driveshaft, for example during start-up. Thus in a three rotor stage, some or all of the rotors may have clutches between the rotors and the driveshaft. As described above, the stages may be repeated along the driveshaft.

In an alternative embodiment, the mounting means may be a rigid mounting mounted between the third rotor, each of the first and second rotors and the driveshaft. Instead of the use of clutches, the electrical windings on the rotor arrays in successive stages may be selectively electrically energized, that is, between open and closed circuits for selective windings wherein rotational resistance for rotating the driveshaft is reduced when the circuits are open and increased when the circuits are closed. Staging of the closing of the circuits for successive stator arrays, that is, in successive stages, provides for the selective gradual loading of the generator. By the use of control electronics, which activate and deactivate individual coils, the output of the generator can be varied from zero to the nominal power rating. Thus the generator can produce a variable power output at a fixed frequency. The control electronics could also be used to vary the voltage of the generator output. By connecting coils in series or parallel the voltage can be varied instantaneously.

There are numerous other unique and novel attributes to the disclosed invention that offer desirable advantages over prior art. Some of these include closed flux path magnetics, hybrid magnetics, pre-processing electronics, mechanical sine wave control, and a unique fault control system.

When additional stages are added electrically, increased mechanical resistance will Slow the rotation of the rotor as a result of the effect of adding load and the additional resistance it creates. This process will control current flow while creating additional energy with available kinetic energy that might otherwise be wasted. When either the input source or the demand for energy is low, only one or two stages of the system stages may be engaged. This allows the Variable Input system to operate when conventional systems would be shut down due to insufficient prime-mover energy or excessive resistance created by "oversized" generator systems. Unlike conventional systems, the PPMCG output can be modified to accommodate constantly changing source energy "or" constantly changing energy consumption. For example, when energy demand is low at night, the PPMCG system will simply disengage un-necessary stages. This will be particularly advantageous to Hydro systems that are challenged to adapt to changing energy demands.

The PPMCG system varies stage engagement as required for optimal output. The current PPMCG design divides the generator into 18 distinct 3 coil (three phase) stages bundled together in a single generator. The three coils, one from each of the three stators in a three stator system, may be connected to each other in series or parallel depending upon the desired application. The PPMCG's unique staged internal configuration and pre-processing electronics will allow the system to serve as its own electronic gearbox (with 18 stages for example) offering greater control over the induction process and thus offering a better quality power output. As part of the power electronics, a PWM (pulse wave modulator) can be used to ensure a smooth transition from one staging configuration to the next.

The generator sections are monitored by the "Pre-Signal" Processing circuit, which allows the device to harmonize output voltage and system resistance with grid requirements, simultaneously through adding and removing independent generator stages.

With the PPMCG, the current from each stage of the system is monitored by a pre-signal processing circuit that determines what system configuration is most beneficial based upon readily available information. When the turbine (prime-mover) reaches adequate momentum the pre-signal processing circuit will engage the first stage. Each stage is monitored and additional stages are added, or removed, by the control system depending on availability of the energy source and the current operating condition of existing engaged stages. The result of this process is greater overall energy output due to capturing more of the potential energy of the wind or other transient energy source.

The PPMCG utilizes a completely closed magnetic field path. The disclosed generator system is divided into pairs of magnets arranged in a shape that is similar to two opposing horseshoes with two coil cores in the middle to complete the circuit thus directly inducing magnetic flux into either end of an isolated electromagnet with a North-Pole field orientation on one end, and a South-Pole field orientation on the other. This salient-pole-to-salient-pole configuration creates opportunities for increased electrical current due to a more direct induction process where flux is allowed to move freely though the coil cores and in a completed magnetic field path. The geometry of this arrangement isolates the induction process in such a way as to increase the field density at the induction coil poles while at the same time greatly reducing undesired flux leakage.

This configuration of induction coils and magnets will increase the power to weight ratio as smaller magnets can be used to create same output as larger magnets in less efficient systems. This design will prove equally beneficial for induction style generators increasing flux density where it is needed and reducing unwanted leakage.

Another significant benefit of this isolated induction process in that there is greater opportunity to utilize various advantageous materials in the generator construction. With conventional systems, there are many parts of the generator that must be made of specific materials. An example of this is the casing for many existing systems needing to be a conductive metal (i.e. ground). With the PPMCG lighter and cheaper materials can be used and in some instances it may not be desirable to have certain components (such as a casing) at all, thus offering a reduction in overall weight and manufacturing costs.

With the PPMCG a coil is wrapped around a backing plate for two permanent magnets. When an appropriate electric current is passed through the coil it acts as an amplifier of the magnetic field. Research indicates that it is possible to increase the strength of the magnetic field by twice the sum of the individual magnetic fields (the permanent magnet and the electromagnet). Since increasing the strength of the magnetic field increases the current generated in the coils of a generator, this technology represents an exciting opportunity to increase the power to output ratio for generators and motors.

A coil would just have to be wrapped around the backing plates for the permanent magnets creating a permanent magnet augmented with an electromagnet. Such a design could provide an even more powerful PPMCG also providing even more control over the output of the PPMCG, since the hybrid coils could be used as a fine control of the magnetic field and thus the output of the PPMCG.

The PPMCG pre-processing algorithmic microprocessor will use a semiconductor switching system to match source with load to engage, or disengage, electrical circuits for each of the induction coils of a three armature/three stator system. Appropriate conditioning electronics (i.e. filters) between the semiconductor switching system and the grid will ensure seamless and trouble-free grid integration.

The system will monitor relevant conditions such as load, prime-mover status and the state of the current collective of engaged stages to determine exactly when it is optimal to engage or disengage the next generator stage.

With the PPMCG, the power electronics are not exposed to the collective and significant implications of a fault current representing the entire generator output due to the isolation of independent coils throughout the system. Dividing the output current into smaller manageable sections within the PPMCG System significantly reduces the negative impact of faults in the stator windings. Far less current is created by each three-coil sub-system, or staged-element, and therefore negative system fault impacts are localized and minimized. For example, if an 18 coil stator is used in a three phase system with 9 complete stator assemblies, the generator will have 18.times.3 or 54 independent 3 phase sub-stages (162 coils divided into 3 phase sub-stages). Each of which will be managed with a simple semiconductor switching mechanism to isolate faults. The microprocessor may be designed to assess the status of each three-coil stage prior to engaging it, and if in fact the stage is faulted, the system will automatically skip this stage element allowing the generator to continue operation where conventional systems would require shut down and immediate repair. This segmenting of generator sections offers many advantages in controlling the system as well as in reducing issues with system damage and safety.

Control over the shape of the output sine wave created by the generator is another unique opportunity that is offered by the PPMCG design. Through shaping the field coils poles the induction process can be manipulated in such as way as to form the desired waveform as a raw output signal. As the magnets pass by the field coil poles, the magnetic field strength that passes through the coil cores will be relative to the air gap between the magnetic influence and the induction coil poles. Therefore, by controlling the shaping the poles, the desired sinusoidal waveform can be produced as the raw unprocessed output. The result of this design attribute is a better quality raw output signal with reduced requirements for expensive power conditioning equipment.

BRIEF DESCRIPTION OF DRAWINGS

Without restricting the full scope of this invention, the preferred form of this invention is illustrated in the following drawings:

FIG. 2 is, in front perspective exploded view, the generator of FIG. 1;

FIG. 3 is the generator of FIG. 2 in rear perspective exploded view;

FIG. 4 is a partially exploded view of the generator of FIG. 1 illustrating the grouping of the rotor and stator pairs into three pairs per stage;

FIG. 4a is, in front elevation view, the generator of FIG. 1 with the front rotor plate removed so as to show the radially spaced apart magnet and coil arrangement;

FIG. 8 is the rotor and stator pair of FIG. 7 in rear perspective exploded view;

FIG. 9a is a cross sectional view through an exploded front perspective view of the rotor and stator pair of FIG. 9;

FIG. 10 is, in partially cut away front elevation view, an alternative embodiment of the present invention illustrating an alternative radially spaced apart arrangement of rotor and stator arrays;

FIG. 11a is in side elevation a further alternative embodiment of the generator according to the present invention wherein the stator coils are parallel to the driveshaft on a single stage;

FIG. 11b is in side elevation two stages according to the design of FIG. 11a;

FIG. 11c is, in side elevation, three stages of a further alternative embodiment wherein the stator coils are inclined relative to the driveshaft;

DETAILED DESCRIPTION

The following description is demonstrative in nature and is not intended to limit the scope of the invention or its application of uses.

There are a number of significant design features and improvements incorporated within the invention.

The device is a generator polyphasic multiple coils in staged staggered arrays.

Incorporated herein by reference in its entirety my U.S. Provisional Patent Application No. 60/600,723 filed Aug. 12, 2004 entitled Polyphasic Stationary Multi-Coil Generator. Where any inconsistency exists between these documents and this specification, for example in the definition of terms, this specification is to govern.

Figure 1:
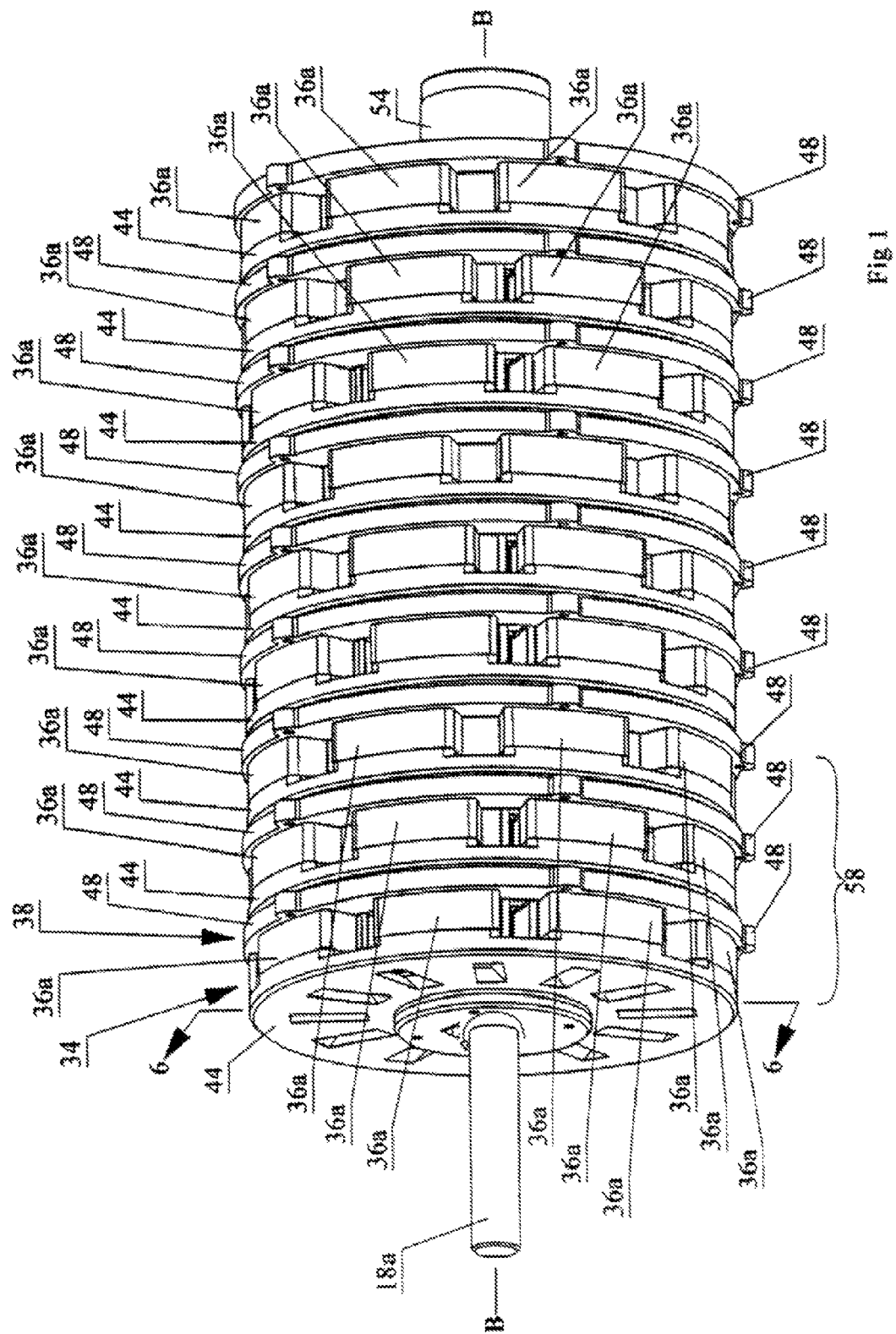
FIG. 1 is, in front perspective view, a further embodiment of the polyphasic multi-coil generator according to the present invention illustrating by way of example nine rotor and stator pairs wherein the nine pairs are grouped into three stages having three rotor and stator pairs within each stage, the radially spaced arrays of magnets on each successive rotor within a single stage staggered so as to be angularly offset with respect to each other.
Figure 1A:
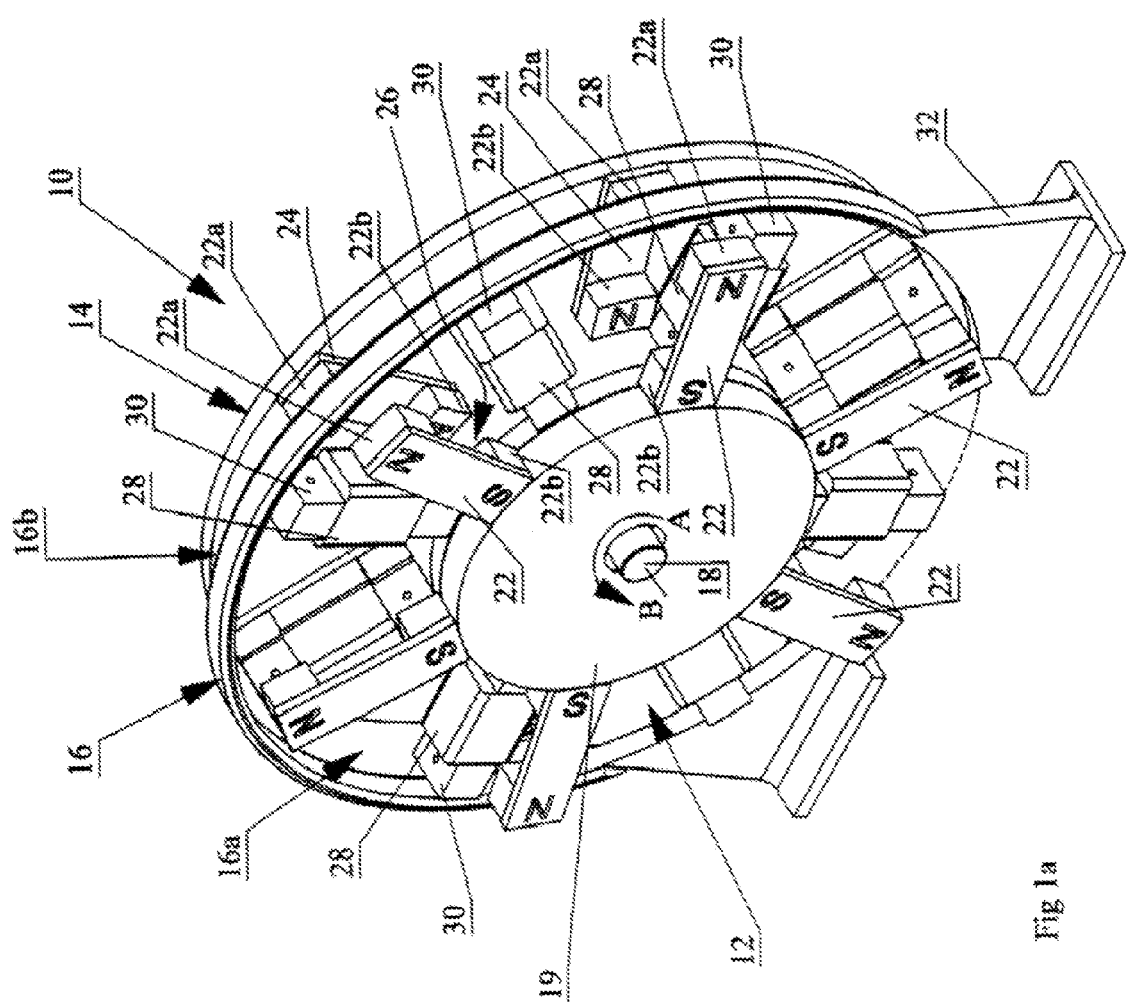
FIG. 1a is, in partially cut away perspective view, one embodiment of the polyphasic multi-coil generator showing a single stator sandwiched between opposed facing rotors.
Figure 5:
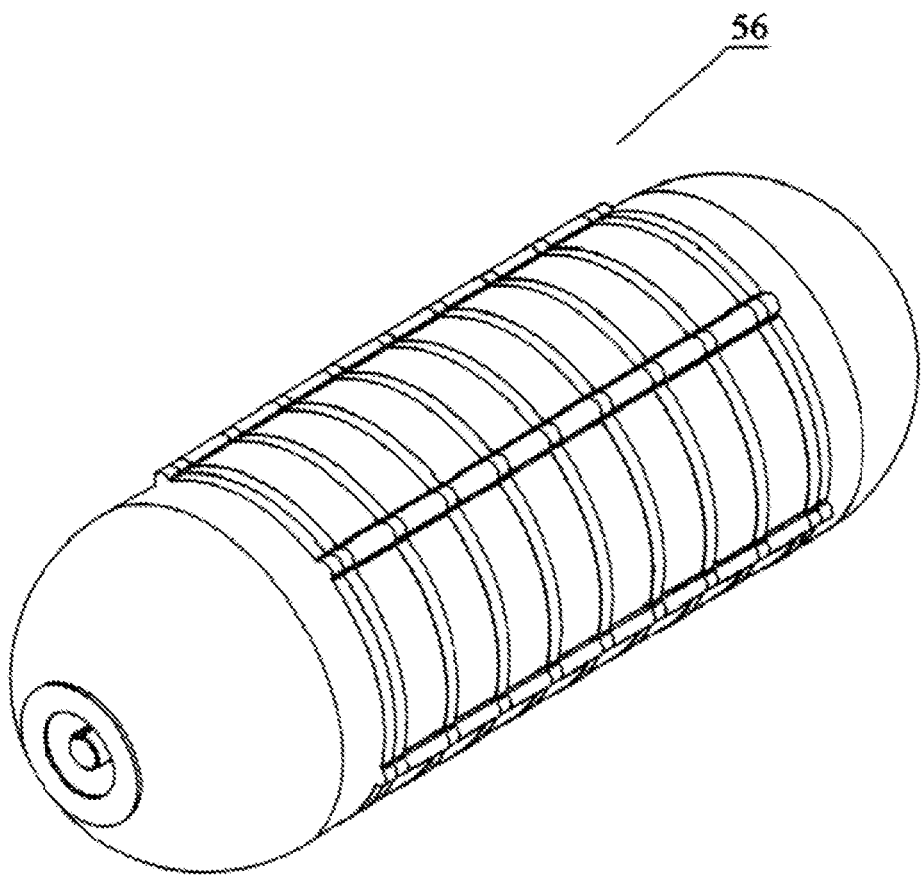
FIG. 5 is, in perspective view, the generator of FIG. 1 within a housing.
Figure 6:
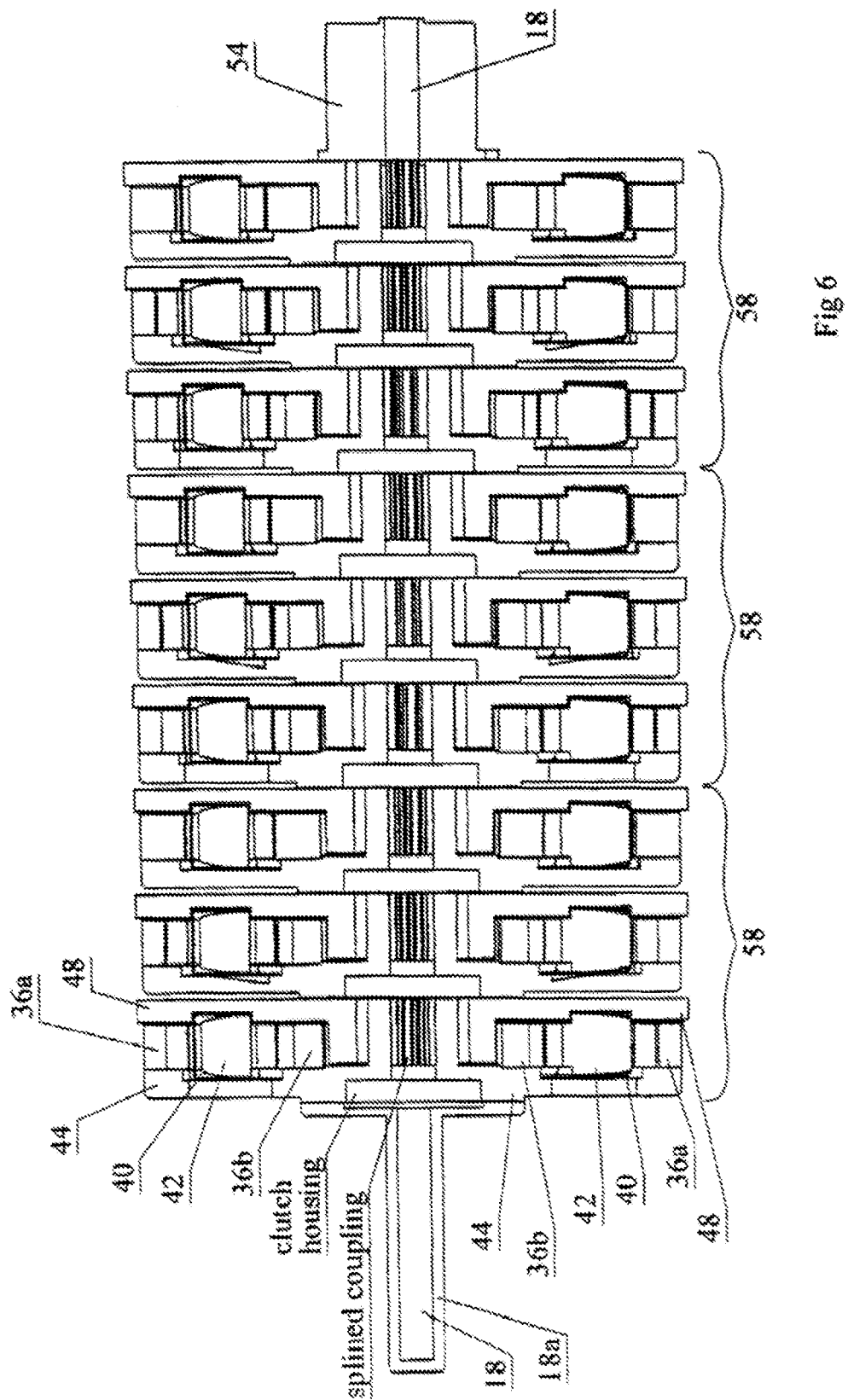
FIG. 6 is a sectional view along line 6-6 in FIG. 1.
Figure 7:
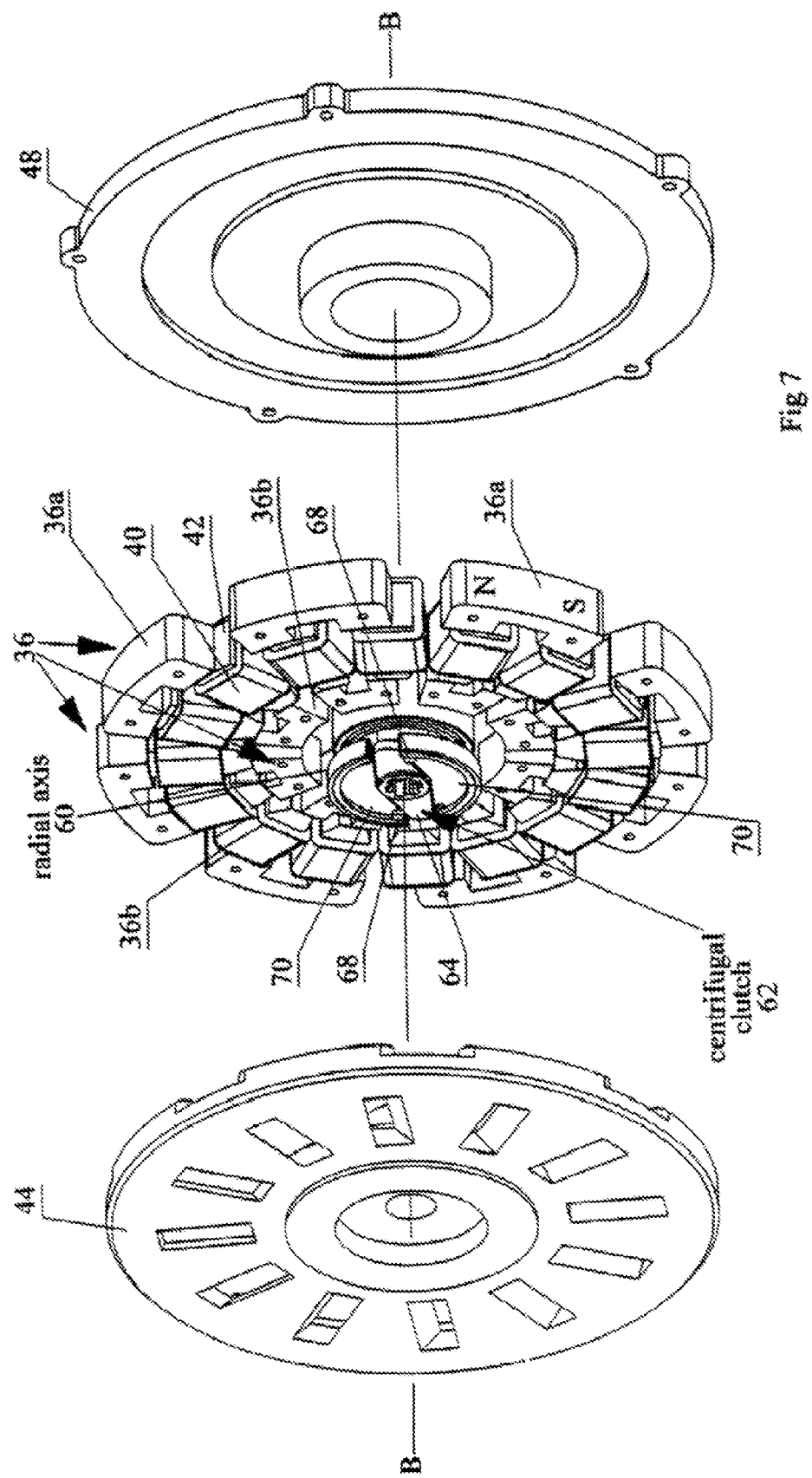
FIG. 7 is, in front perspective exploded view a single rotor and stator pair of the generator of FIG. 1.
Figure 9:
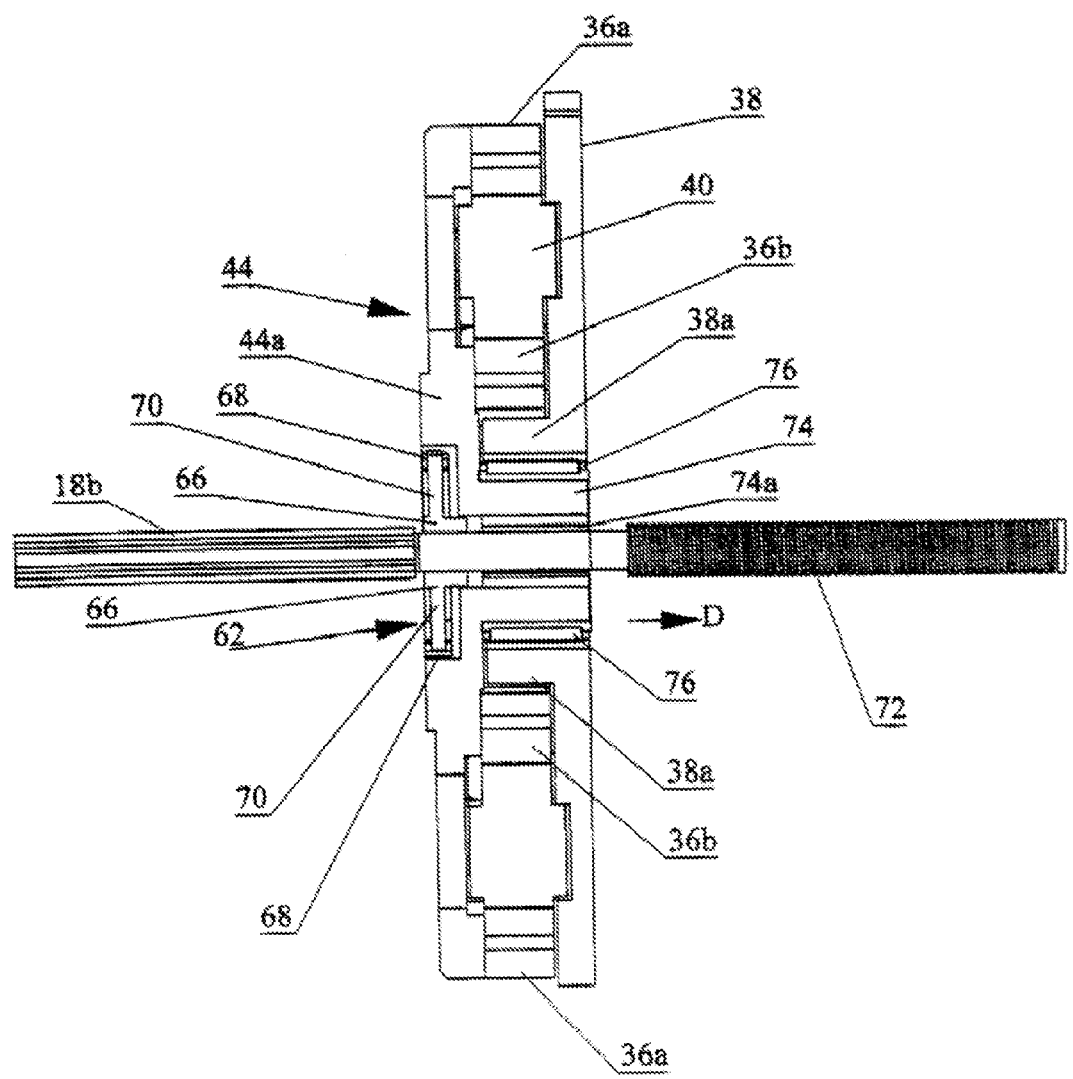
FIG. 9 is, in cross sectional view, an alternative embodiment of a single rotor and stator pair illustrating the use of a centrifugal clutch between the rotor and the driveshaft.

In FIG. 1a, wherein like reference numerals denote corresponding parts in each view, a single stage 10 of the polyphasic multi-coil generator according to the present invention includes a pair of rotors 12 and 14 lying in parallel planes and sandwiching there between so as to be interleaved in a plane parallel and lying between the planes of the rotors, a stator 16. Rotors 12 and 14 are rigidly mounted to a driveshaft 18 so that when driveshaft 18 is rotated by a prime mover (not shown) for example in direction A, rotors 12 and 14 rotate simultaneously at the same rate about axis of rotation B. Feet 32 are provided to mount stator 16 down onto a base or floor surface. Rotors 12 and 14 each have a central hub 19 and mounted thereon extending in an equally radially spaced apart array around driveshaft 18 are pairs of magnets 22a and 22b. Although only one pair of magnets, that is, only two separate magnets are illustrated, with a keeper shown between to increase flux, a single magnet with the polarities of either end inducing the coils may be used with substantially equal results. Each pair of magnets is mounted on a corresponding rigid arm 24 extended cantilevered radially outwardly from hub 19. Each pair of magnets 22a and 22b are spaced apart along the length of their corresponding arm 24 so as to define a passage or channel 26 between the pair of magnets.

Electrically conductive wire coils 28 are wrapped around iron-ferrite (or other favorable magnetically permeable material) cores 30. Cores 30 and coils 28 are mounted so as to protrude from both sides 16a and 16b of stator 16. Coils 28 are sized so as to pass snugly between the distal ends 22a and 22b of magnets 22, that is, through channel 26 so as to end couple the magnetic flux of the magnets with the ends of the coils. In the embodiment illustrated in FIG. 1a, again which is not intended to be limiting, eight coils 28 and corresponding cores 30 are mounted equally radially spaced apart around stator 16, so that an equal number of coils and cores extend from the opposite sides of stator 16 aligned so that each coil and core portion on side 16a has a corresponding coil and core immediately behind it on the opposite side of stator 16, that is, on side 16b. It is to be understood that although this embodiment employs an eight coil array, however, any number of coils with corresponding magnet assemblies may by employed. For example, in one embodiment, this design uses sixteen coils and two sets of armatures (that is rotors) with twelve sets of magnets each. This embodiment is not intended to suggest that a single stage may be employed. Any number of stages may be utilized on the same driveshaft.

Rotor 14 is a mirror image of rotor 12. Rotors 12 and 14 are mounted in opposed facing relation on opposite sides of stator 16. The angular orientation of rotors 12 and 14 about driveshaft 18 differs between the two rotors. That is, the magnets 22 on rotor 14 are angularly offset about axis of rotation B relative to the magnets mounted on rotor 12. For example, each of the pairs of magnets on rotor 14 may be angularly offset by, for example, and offset angle .alpha. (better defined below) of five degrees or ten degrees or fifteen degrees relative to the angular orientation of the pairs of magnets on rotor 12. Thus, as rotors 12 and 14 are simultaneously being driven by rotation of shaft 18, as a magnet 22 on rotor 12 is being magnetically attracted towards a next adjacent core 30 portion on side 16a of the stator, the attractive force is assisting in pushing or drawing the corresponding magnet on rotor 14 past and away from the corresponding core portion on side 16b of stator 16. Thus the attractive force of incoming magnets (incoming relative to the coil) on one rotor substantially balances the force required to push the corresponding magnets on the other rotor away from the coil/core. Consequently, any one magnet on either of the rotors is not rotated past a core merely by the force of the rotation applied to driveshaft 18, and the amount of force required to rotate the rotors relative to the stator is reduced. The efficiency of the generator is thus increased by the angular offsetting of the magnet pairs on opposite sides of the stator acting to balance or effectively cancel out the effects of the drawing of the magnets past the cores.

Further stages may be mounted onto driveshaft 18 for example further opposed facing pairs of rotors 12 and 14 having a stator 16 interleaved there between. In such an embodiment, further efficiency of the generator may be obtained by progressive angular offsetting of the magnets so as to angularly stagger each successive rotors' array of magnets relative to the angular orientation of the magnets on adjacent rotors. Thus, with sufficient number of stages, the magnetic forces may be relatively seamlessly balanced so that at any point during rotation of driveshaft 18, the attractive force of the magnet approaching the next adjacent cores in the direction of rotation balances the force required to push or draw the magnet pairs on other rotors away from that core thus reducing the force required to rotate driveshaft 18.

A further embodiment of the invention is illustrated in FIGS. 1-9, again wherein similar characters of reference denote corresponding parts in each view. In the illustrated embodiment nine banks of rotors 34 each have radially spaced apart arrays of magnet pairs 36a and 36b wherein the arrays are angularly displaced or staggered relative to adjacent arrays on adjacent rotors. Thus each magnet pair 36a and 36b in the equally radially spaced array of magnet pairs 36a and 36b, radially spaced about axis of rotation B are angularly offset by the same offset angle .alpha., for example, five degrees, ten degrees or fifteen degrees, between adjacent rotors. Thus the successive banks of rotors are cumulatively staggered by the same angular displacement between each successive rotor so as to achieve a more seamlessly magnetically balanced rotation of the rotors relative to the stators 38 and in particular relative to the coils 40 and cores 42 mounted on stators 38.

Magnets 36a and 36b are mounted onto a carrier plate 44. The carrier plate 44 for each rotor 34 is rigidly mounted onto driveshaft 18. Coils 40 and their corresponding cores 42 are mounted onto a stator plate 48. Stator plate 48 is rigidly mounted to housing 56, which itself may be mounted down onto a base or floor by means of rigid supports (not shown).

In one alternative embodiment not intending to be limiting, a small motor 54, which is in addition to the prime mover (not shown), may be employed to engage additional stages or banks having further progressively angularly displaced or staggered stages or banks of magnet pairs in radially spaced array on successive rotors. For example motor 54 may selectively drive a shifter rod so as to sequentially engage centrifugal clutch mechanisms on each rotor as described below.

A housing 56 may be provided to enclose stators 38 and the armatures or rotors 34. Housing 56 may be mounted on a supporting frame (not shown), and both may be made of non-magnetic and non-conductive materials to eliminate eddy currents. In one embodiment of the invention, not intended to be limiting, a single stage 58 of the generator includes three stators 38 interleaved with three rotors 34. The generator may include multiple stages 58 along the driveshaft to reduce the magnetic drag by offsetting any resistances created within the generator.

Stators 38 may include a plurality of induction coils 40 made of electrically conducting materials, such as copper wire. Each induction coil 40 may be wrapped around a highly ferromagnetic core such as a soft iron core 42. Alternatively, induction coils 40 may be air coils (that is, not wrapped around any core) for applications where less output current is required or where less mechanical force is available to be applied to rotors 38. In the illustrated embodiment of the invention, the stators are disk shaped. The embodiment of FIG. 1a includes eight induction coils 28 mounted equidistant and equally radially spaced apart from each other on a plate or disk made of non-magnetic and non-conductive materials. In the embodiment of the remaining figures, stators 38 include sixteen induction coils 40 on each stator disk or plate 48. The number of induction coils 40 may vary depending on the application of the generator, and may be only limited by the physical space available on the stator plate.

The induction coils 40 may be configured such that a first set of induction coils 40 produce a first independent phase signal and a second set of induction coils 40 produce a second independent phase signal with opposing wave signals. The induction coils 40 are alternately orientated such that an induction coil 40 producing the first independent phase signal is positioned in between induction coils 40 producing the second independent phase signal. In such dual phase design, the two independent phases are exact reciprocals of each other wherein one independent phase may be inverted to combine the potential current of the two into one phase with a synchronous wave pattern. Preferably, each of the first set and second set of induction coils 40 have an equal number of induction coils 40 wrapped around their cores 42 in a first direction and an equal number of induction coils 40 wrapped around their cores 42 in an opposite second direction to align the currents of the two phases. For example, in the embodiment wherein the stators 38 include sixteen, that is, two sets of eight induction coils 40 (alternate phases), each of the first set of eight induction coils 40 will produce a first independent phase signal and the second set of eight induction coils 40 will produce a second independent phase signal.

Rotors 34 may have magnets 36 of any magnetic materials such as neodymium magnets. Rotors 34 each include an array of equally spaced apart pairs of magnets 36a and 36b which are mounted on rotor plates made of non-magnetic and non-conductive materials so as to discourage straying flux lines or eddy currents. In the embodiment having sixteen induction coils 40 on each stator, the rotor array of magnets (the "rotor array") includes eight "U"-shaped opposed facing pairs of magnets 36 on each rotor 34. Each end of each "U"-shaped magnet 36, sixteen ends in all on the radially outer ring and sixteen on the inner ring, are paired to the corresponding sixteen coils as the ends of the magnets are rotated closely past the opposite ends of the coils.

In the illustrated embodiment of FIG. 1 the rotor arrays between successive rotors 34 in stage 58 are angularly offset about the axis of rotation B of the driveshaft by an offset angle .alpha. of for example fifteen degrees. It is understood that an offset of fifteen degrees is merely one preferred offset, but it may be any number of degrees of offset. Offset angle .alpha. is seen best in FIG. 4a as the angle between the radial axes 60 and 60' of magnets 36a and 36a' of successive rotors 34.

As the rotors are driven to rotate about the driveshaft by an outside motive force, such as for example wind or water or other prime movers, the magnets 36 travel towards induction coils 40 by attraction of the magnets to the cores 42. AC pulse is created in all the induction coils on the stators as the induction coils are designed to draw the magnetic flux from the magnets 36. In the embodiment of FIG. 1a, which is illustrative, the opposing polarity of the magnets between each rotor and the angularly offset alignment of the rotor array relative to each other permits the magnets to be drawn away from one core and towards the next core. For example, the north, south (N,S) polarity configuration of the magnets on the first rotor 12 is drawn by the opposing south, north (S,N) polarity configuration of the magnets on is the second rotor 14, where the first rotor array is offset by fifteen degrees relative to the second rotor array such that the magnetic attraction between the magnets on the first rotor and the magnets on the second rotor draws the magnets away from the core. The balancing of magnetic forces between magnets on the rotors reduces the work required from the driveshaft to draw magnets off the induction coils, thereby increasing the efficiency of the generator.

The rotating magnetic fields created by the configuration of the magnets with alternating magnetic orientation between rotors and the alternating multi phase configuration of the induction coils create multiple reciprocal AC phase signals. As the induction coils are stationary, AC power may be harnessed directly from the induction coils without brushes. The regulation and attenuation of these currents may be achieved by methods known in the art. As the magnets pass the induction coils, they induce a current that alternates in direction. Magnets may be configured such that for example an equal number of magnets influence the first set of induction coils by a N,S magnetic polarity as the number of magnets influencing the second set of induction coils by a S,N magnetic polarity. The configuration of the rotors create an alternating current in each of the two phases of the single stage embodiment of FIG. 1*a*. The configuration of magnetic forces allow for a balancing of the resistances within the generator.

Figure 11:
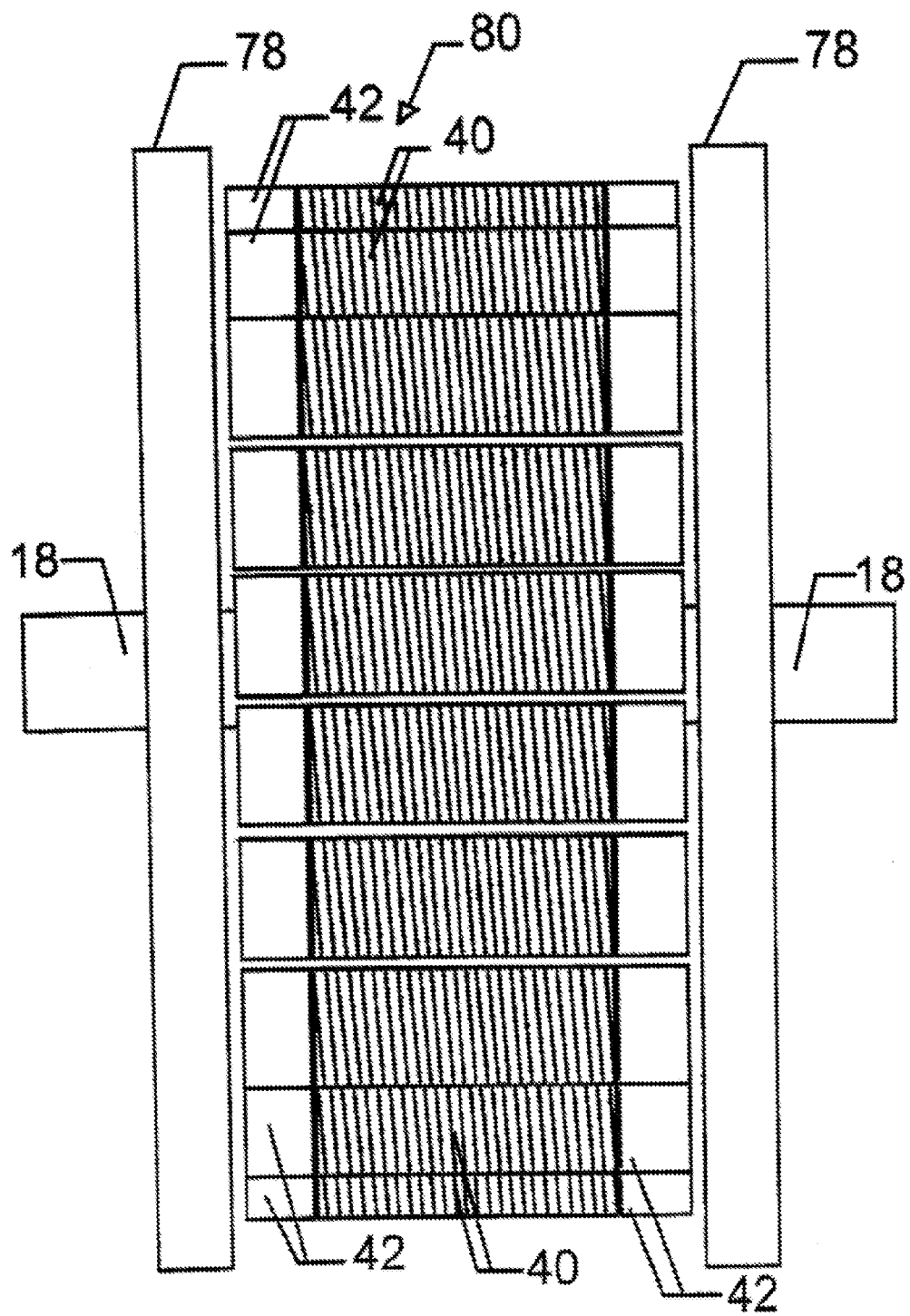
Figure 11:
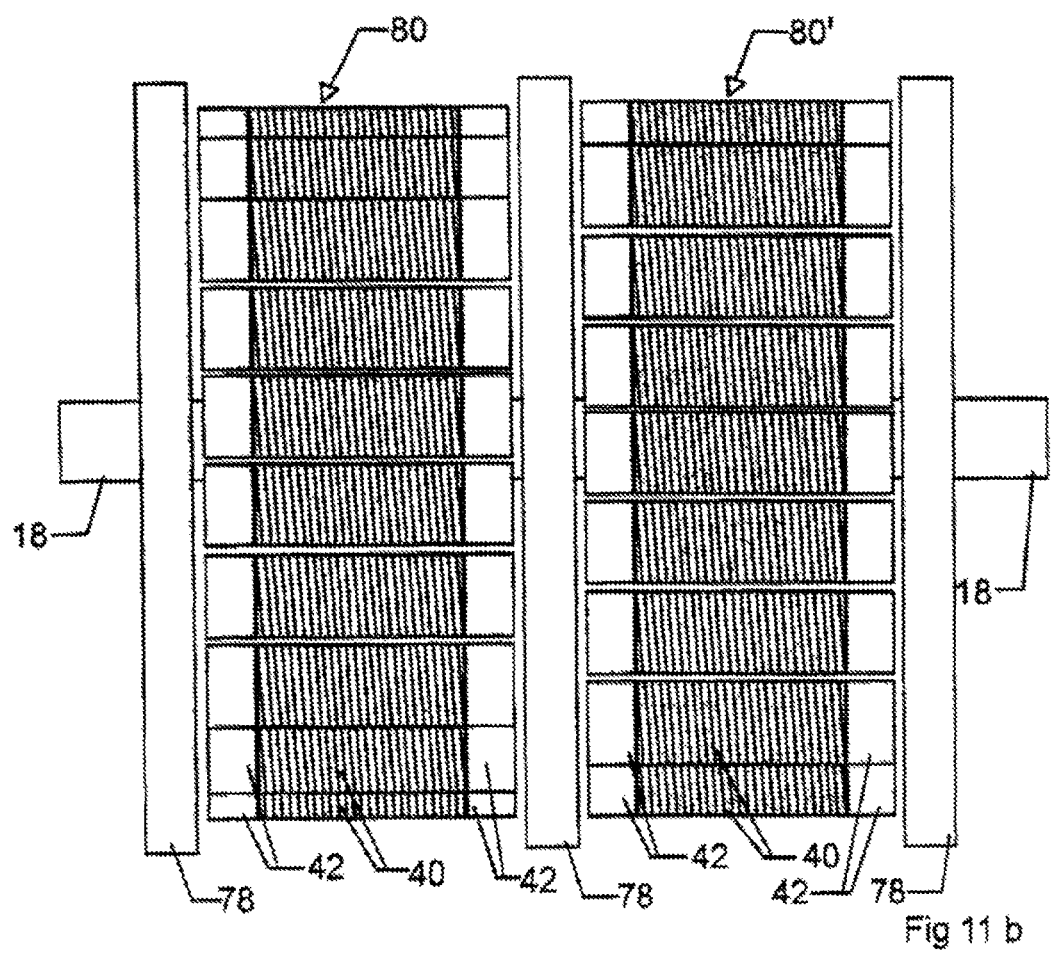

In an alternative embodiment, such as seen in FIGS. 1-9, there is a significant advantage to the addition of multiple stages on the driveshaft. The work required to rotate the driveshaft may be even further reduced through the addition of multiple stages 58. The alignment of the multiple stages may be offset such that additional stages further reduces resistance in the generator by accomplishing even greater balancing of forces than can be done with a single stage design. Alignment of stator arrays of coils ("stator array") may be offset or alternatively, the alignment of the rotor arrays may be offset to reduce resistance. Consequently, adding additional stages may increase electrical output without proportionally increasing resistance within the generator. While additional induction coils will increase magnetic drag, the greater balancing of forces achieved by the orientation of the stator arrays and rotor arrays of the additional stages offsets the increase in drag and further increases the overall efficiency of the generator. Additional stages may be engaged so as to rotate the additional rotors by any number of mechanisms, such as current driven sensors that use solenoids, or clutches such as the centrifugal driven clutch mechanisms of FIGS. 7-9, 9*a* which may be used to engage the next stage when the rotor of a subsequent stage achieves a predetermined speed. An example of a clutch is illustrated. Clutch 62 is mounted within the hub of each of rotors 34. Rotation of a clutch arm 64, once the clutch is engaged by the splines on the splined portion 18*b* of driveshaft 18 engaging matching splines within the arm hub 66, drives the arm against stops 68. This drives the clutch shoes 70 radially outwardly so as to engage the periphery of the shoes against the interior surface of the rotor carrier plate hub 44*a*. A linear actuator, for example such as motor 54, actuates shifter rod 72 in direction D so as to engage splined portion 18*b* with firstly, the splines within the arm hub 66. Then, once the clutch engages and the rotor comes up to nearly match the rotational speed of the driveshaft, the splined portion is further translated so as to engage the splines 74*a* within the rotor huh 74. Subsequent rotor/stator pairs or subsequent stages, such as stages 58, may be added, by further translation of the shifter rod into the splines of subsequent clutches and their corresponding rotor hubs. In a reversal of this process, stages are removed by withdrawing the shifter rod. Rotor hubs are supported by needle bearings 76 within stator huh 38*a*. In the further alternative, linear motor driven mechanisms or spline and spring mechanisms may be used. FIG. 10 is a further alternative embodiment wherein the coils are offset in a concentric circle around the driveshaft to achieve the magnetic balancing. The coils are aligned end to end in a concentric circle around the driveshaft in the further alternative embodiment seen in FIGS. 11*a*-11*c*. The induction coils 40 are mounted parallel, or slightly inclined as in FIG. 11*c*, relative to the driveshaft to reduce the draw of magnetic flux from between the rotors due to the close proximity and the strength of the magnets. A further advantage of positioning the induction coils parallel to the driveshaft is that drawing magnets directly past the end of each induction coil rather than from the side may be more efficient in inducing current in the induction coils. A horizontal orientation of the induction coils may also permit doubling the number of induction coils in the generator, resulting in greater output. In the embodiment of FIG. 11*b*, the two stator arrays 80 and 80' have an angular offset relative to each other that is one half of the desired total angular offset, that is, the alignment that provides for optimum balance. The next successive stator array may then have the same angular offset as between stator arrays 80 and 80'. As in the other embodiments the angular offset may be appropriately offset for any number of stages. This embodiment shows that the coils may be offset while leaving the magnet arrays in the armatures/rotors in alignment, that is without an angular offset between successive rotor arrays, and still accomplish the balancing effect.

As stated above, multiple stages reduce resistance as each stage is added. For example, within a stage having three rotor/stator pairs, rather than a single induction coil being induced by the passing of two magnets with opposing magnetic poles, such an embodiment allows two induction coils to effectively align between the magnetic influences of the rotor arrays. In addition to increasing the number of induction coils, the rotors arrays are much further apart, thus significantly reducing the incidence of straying magnetic flux across the space between the rotors.

To appropriately orientate additional stages for a staging application, the rotor arrays may be appropriately angularly offset as described above. Alternatively as seen in FIG. 11*c*, the induction coils may be angled such that the rotor arrays are not perfectly aligned in parallel to each other. As induction coils 40 and their corresponding cores 42 are on a slight angle, magnets (not shown) on rotors 78 on either side of the stator arrays 80 are preferably misaligned too as the magnetic influence from the magnets should induce each of the induction coils from both ends simultaneously for optimum function. In an embodiment of the invention, the misalignment of rotor arrays is increasingly smaller, becoming negligible as more stages are added. As additional stages are added, the less of an angular offset exists between the subsequent rotor arrays with the stages. Any number on of stages may be added to the driveshaft and additional stages may be aligned or misaligned with other stages within the generator, depending on the desired function.

The optimum number of stages may be determined by the degrees of offset of each stage relative to the previous stage. The number of induction coils in the stator arrays need not depend on the corresponding number of magnets in the rotor arrays. The stator arrays may include any number of induction coils and they may or may not be symmetrical in their placement about the stators.

There are many applications for a generator according to the present invention. For example, rather than having a wind turbine that requires significant energy to start rotating driveshaft 18 and which may be overloaded when too much wind is applied, the generator may be reconfigured allow the maximum current to be produced regardless of how much wind is driving the generator. This may be accomplished by engaging a greater number of stages, such as stages 58 for example as the wind increases and decreasing the engagement of stages to reducing the number of engaged stages when the wind decreases. Furthermore, the first stage of the generator may include air coils such that very little wind energy is required to start rotating the driveshaft, and subsequent stages may include induction coils having iron cores such that greater currents may be generated when there is greater wind energy. Further, additional stages may increase is size and diameter so as to create greater physical resistance when greater wind energy is present but as well to create more electrical output from the system when input energy is high. When wind energy is minimal, the generator may thus still allow for rotor 30 to rotate as it will engage only one, that is the first stage of the generator. As the wind energy increases, the generator may engage additional stages, thus increasing the output current. As wind energy continues to increase, more stages may be added or engaged to allow for the maximum current to be drawn off the generator. As wind energy decreases in intensity, the generator may disengage the additional stages and thus reduce mechanical resistance, allowing the blades of the wind turbine or other wind driven mechanism to continue to turn regardless of how much wind is present above a low threshold. This generator configuration allows for maximized energy collection.

Applications for such a variable load, generator are numerous as the generator is not only able to adapt to variable source energies, such as wind, but can be adapted to service specific power needs when source energy can be controlled. One example would be a hydro powered generator that rather than turning off at night, and needing to warm up again to service greater power needs in the day, may simply vary its output to suit the night cycle and thus use less source energy to function during that time.

In an alternative design, all of the rotors in all of the stages are rigidly mounted to the driveshaft, so that all of the rotors are rotating simultaneously. Instead of clutches, the windings circuits are left open on, at least initially, many or most of the stages to reduce turning resistance, and only those windings on the stages to be engaged are closed, that is energized. This allows for reduced resistance on the driveshaft overall when a lesser number of stages are electrically engaged. As additional circuits are closed and more windings thus added to the system, this will result in increasing the load of the generator and thus it will increase resistance on the driveshaft. By not requiring clutching mechanisms, the generator may be less expensive to construct and maintain as there are no maintenance issues regarding any clutch mechanisms. This "electrical" staging system may be applied to the magnetically balanced generator design according to the present invention or any other conventional design applicable for the staging application.

It should also be noted that the staging application, mechanical with clutches, or electrical by engaging and disengaging coil array circuitry may be applied to existing generator designs that are appropriately constructed into short, stout sections so as to accommodate the staging application.

One embodiment would have a circuit designed to assess the relevant information about the device such as load information in order to determine and employ the optimal number of stages of a multi-sage generator apparatus. The device could have a circuit designed to assess the relevant prime-mover information in order to determine and employ the optimal number of stages of the generator apparatus, or a circuit designed to assess the relevant prime-mover and load information in order to determine and employ the optimal number of stages of the generator or a circuit wherein each stage is monitored and when deemed appropriate, additional stages are added, or removed, by the control system 100, and where the engagement or disengagement of these multiple stages is determined by the availability of the energy source and/or the current operating condition of existing generator stages or independent coils as part of a stage.

The generator device can also have an apparatus comprising an algorithmic microprocessor connected to a high speed semiconductor switching system designed to match source with load through the engaging, or disengaging, electrical circuits. It can utilizing a pulse wave modulator or similar device in order to offer fine control in smoothing out the transition of generator stages as they are added or removed electrically from the system. The above apparatus incorporating appropriate conditioning electronics, such as filters, between the semiconductor switching system and the grid to ensure the signal is appropriate for grid integration.

The generator will have a system whereas the electronics of the system are capable of checking the integrity of individual coils or series of coils, that represent a single stage, prior to engagement of the stage being accomplished through the creation of a fault current by the system that checks to ensure the integrity of each stage prior to its engagement. The system can have processing circuitry that where as a fault occurs in a coil winding, it is treated as an isolated fault by the processing circuitry. The generator through various fault detection means and whereas said fault occurrence is isolated by the system and avoided by the system through leaving its circuit open and thus out of the collective output signal.

Figure 12:
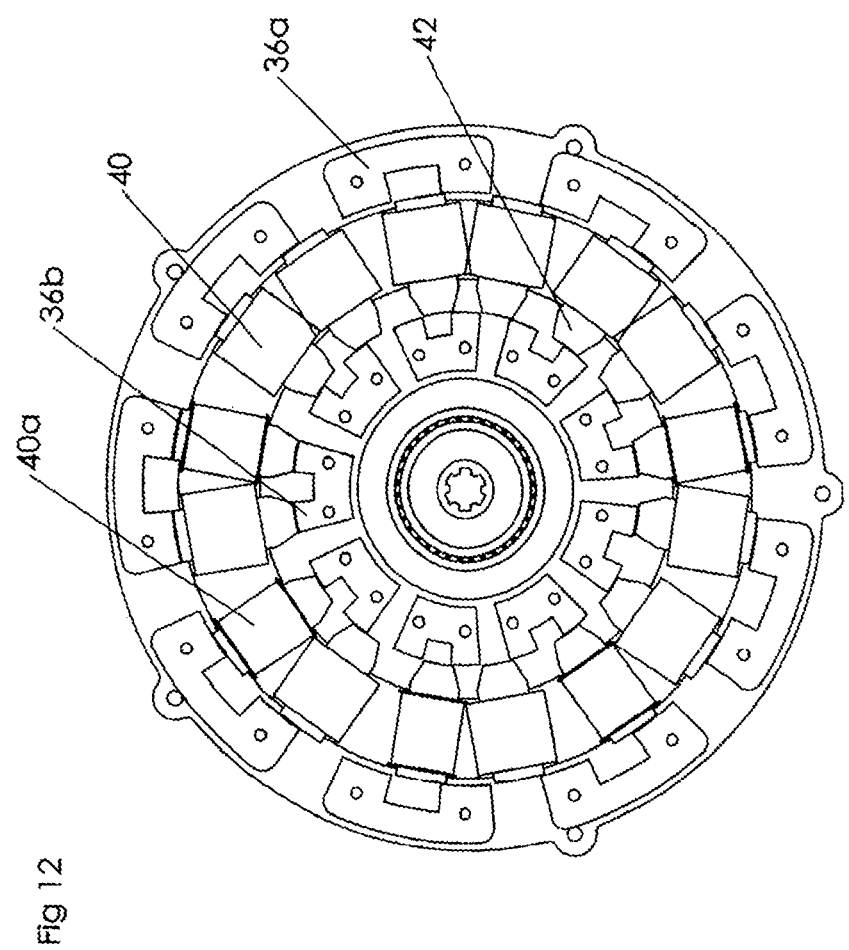
FIG. 12 is, in front elevation view, an alternate embodiment of the generator of FIG. 1 with the front rotor plate removed so as to show a non-symmetrical arrangement of coil cores to magnets where three or more phases can be accomplished with only one stator.

FIG. 12 is, in front elevation view, an alternate embodiment of the generator of FIG. 1 with the front rotor plate removed so as to show a non-symmetrical arrangement of coil cores to magnets where three or more phases can be accomplished with only one stator. Unlike FIG. 4a that has a symmetrical spacing of magnets and field coils, this illustration shows that a variety of different sized coil cores 42 can be utilized and as well, the coil winding can be modified to accomplish different results with the induction process. It can be seen in this illustration that coil windings 40 are larger than coil winding 40a, it may be desirable to create less resistance to the rotation of the shaft in certain circumstances, and with select stages, such as during the generator's start up so as to reduce resistance. As well, the illustration of FIG. 12 shows that a full three phase system, or virtually any number of phases, can be accomplished with just one stator and armature assembly. This can be seen as there are three different mechanical positions with respect to magnets and induction coils and that in this illustration, they are appropriately offset from each other thus they will create the desired three phase output appropriate for most grid systems.

In a stator and armature assembly a stage can represent a single coil or a multitude of coils as is determined by the desired output. The coils may be connected in parallel or series thus creating as many phases in the output signal as is desired. The staging may be accomplished with the coils of a single disk being of equidistant spacing in a radially spaced array, or, an apparatus where stages may be unsymmetrical in spacing as is seen in FIG. 12.

Through the use of an unsymmetrical array, more than one phase may be created from a single stator and armature assembly. A system where various sizes of salient-pole induction coils as seen if FIG. 12 may be employed to create the desirable system performance. The generator can have a configuration of three stator arrays divided into numerous individual induction coils and where each stator array is offset mechanically in such a way as to create a three phase output signal. Also at least one coil from each of the three stator arrays can be connected together either in series or in parallel so as to create a multitude of smaller independent induction stages each having a complete three phase sinewave as appropriate for grid integration, and, where each of these stages creates the same output characteristics as all other stages as a result of identical mechanical geometry with respect to the relationship of magnetic influences to induction coils.

The generator can also have a configuration magnets and coils on a single disk offset in such as way as to create a balanced multiphase output, and where the stator may have more than one size of induction coil, or induction coil cores, being employed in one or more stages offering increased control over resistance and output such as is seen in FIG. 12

Figure 13:
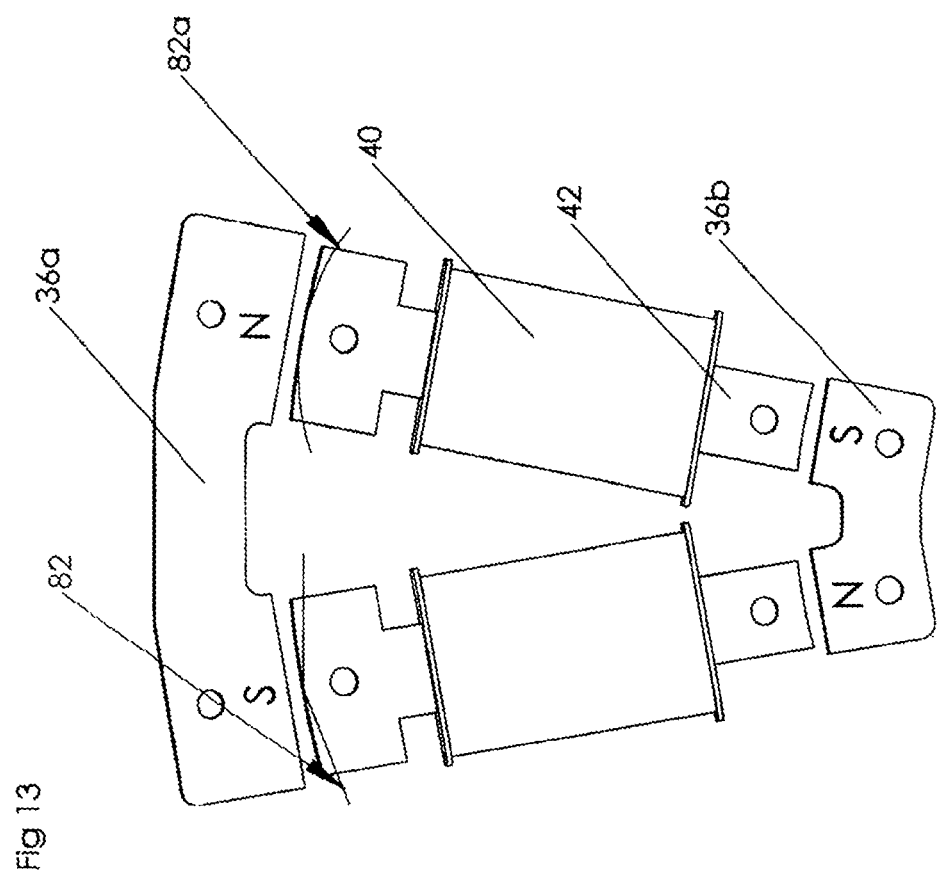
FIG. 13 is, on front elevation view, one embodiment representing a single stage comprised of two magnets and two field coils.

FIG. 13 is, on front elevation view, one embodiment representing a single stage comprised of two magnets and two induction coils. This single induction element, or stage, serves many unique purposes; most significantly it offers an isolated induction process that increases flux density and reduces unwanted flux leakage. The inner magnet 36*a* and the outer magnet 36*b* will create a strong and focussed magnetic field that will induce in a completed path from North magnetic poles to South magnetic poles passing through both of the induction coils 40 and their cores 42 in such as way as to allow an isolated path for the flux.

Additionally, FIG. 13 illustrates how the relationship between stator and armature is "salient-pole to salient-pole". This characteristic of the design allows for manipulation of the physical characteristics of either the magnet end poles or the induction coil core end poles. Through manipulating the shape of the ends of the poles, the sine-wave will take a different shape. If the wave form created has sharp corners due to the abrupt approach of the magnets to the induction coils, then the end of the induction cores 42 may be shaved off as is shown in the illustration by the line pointed to by number 82. Additionally, if it is desirable to create a more gradual, smother induction process, and thus a more rounded sine-wave, a more curved shaping of the induction coil core 42 can be utilized as is shown by the line 82*a*.

The generator can be set up to mechanically manipulate the induction process and thus the output signal created as the magnets pass by the induction coils and manipulate the field strength that passes through the coil cores through changing the air gap between the magnetic influence and the induction coil poles at specific regions of these poles. This can be as illustrated in FIG. 13 where the relationship of magnet poles and induction coil poles is manipulated to create the desired output sine-wave shape and the modification of poles may be to the magnet's poles or the induction coil's pole's, or both, and where the shaping of the end of the poles is allowing a more gradual, less abrupt approach of the magnetic field thus smoothing out operation of the system whereby further reducing cogging torque, and creating a more sinusoidal waveform shape as is desired for integration into most grid systems. It can also allow the outer and or inner magnets to be adjusted so as to allow for and increased or decreased air gap so as to allow fir greater control over the flux density impacting the induction coil and the characteristics of the induction process; particularly those that impact the shape of the resultant sine-wave.

Figure 14:
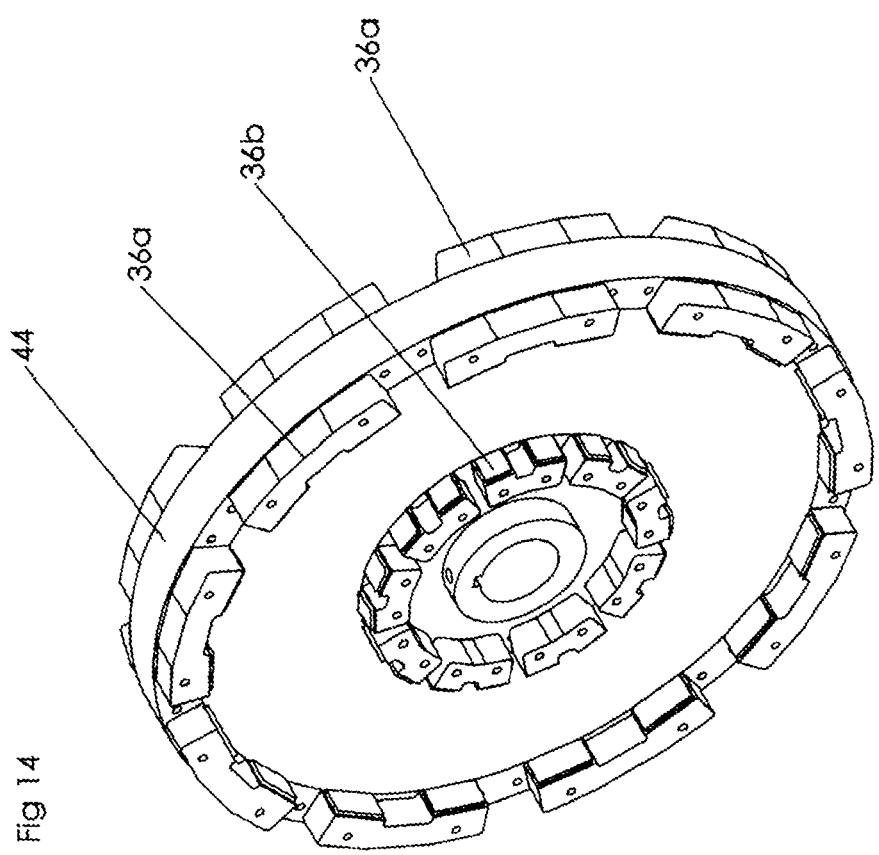
FIG. 14 is, in front perspective view, a single rotor of the generator of FIG. 16.
Figure 15:
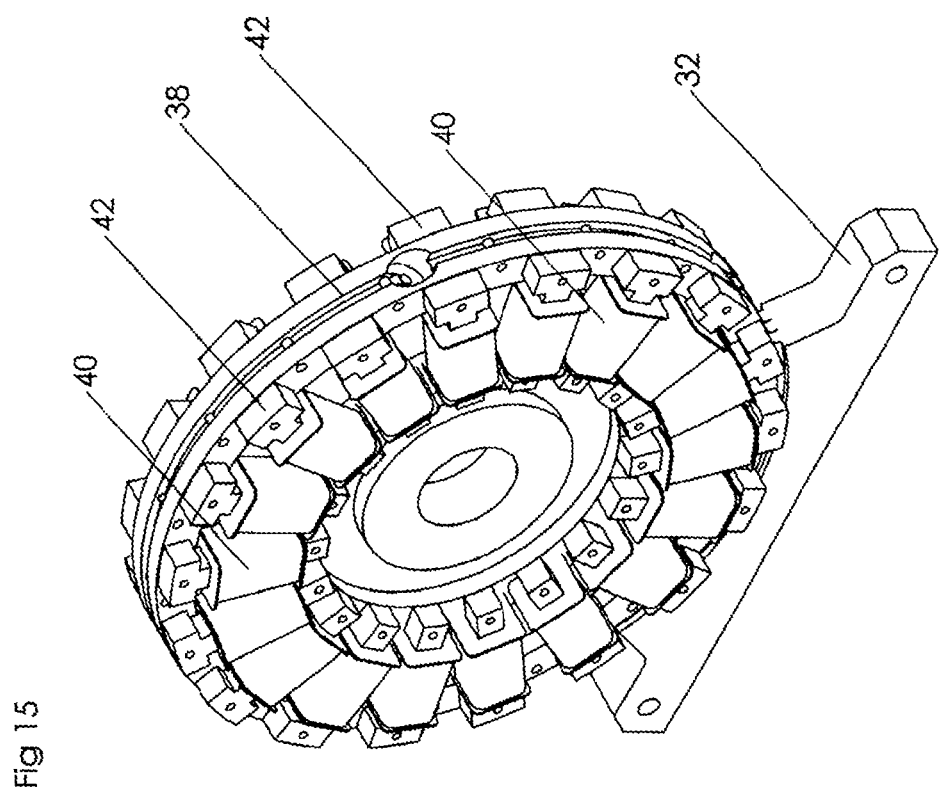
FIG. 15 is, in front perspective view, a single stator of the generator of FIG. 16.
Figure 16:
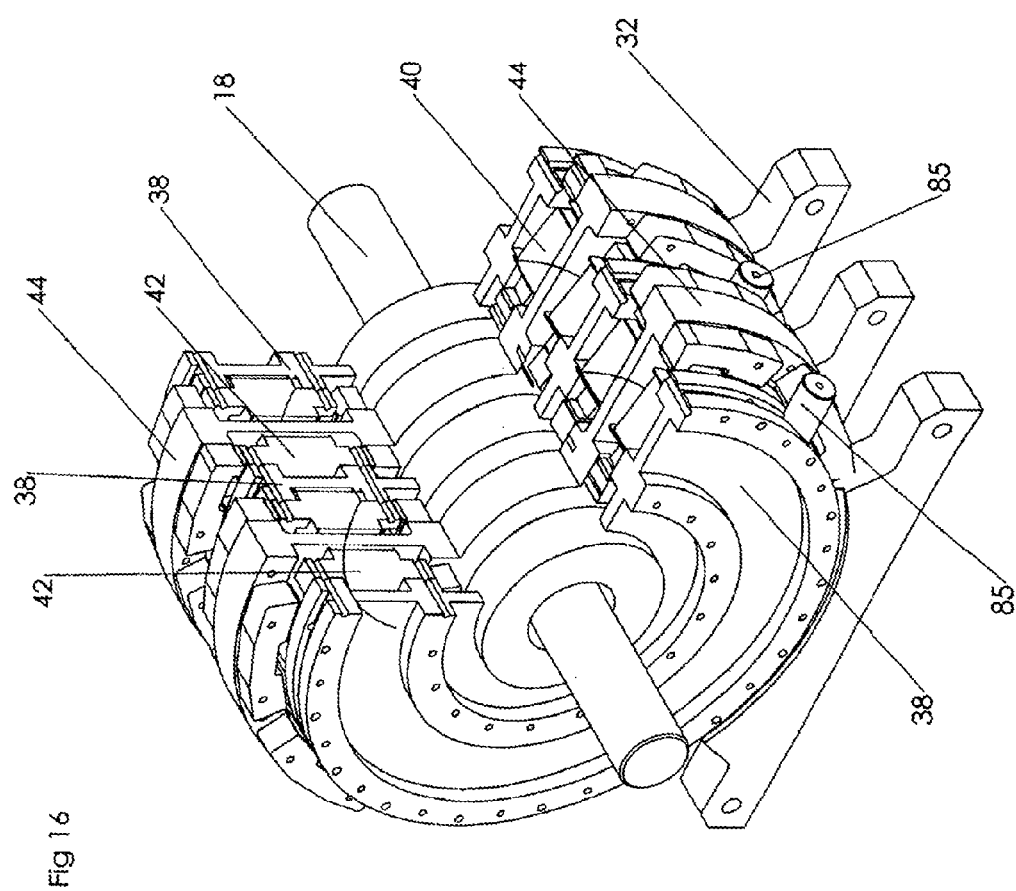
FIG. 16 is, a partial cross sectional view of a front perspective of an alternate embodiment of the generator if FIG. 1 utilizing double sided rotors and stators.

FIGS. 14 to 16 illustrate the parts of yet another alternate design embodiment, focussed on reducing manufacturing costs by utilizing both sides of the stator plate 38 and armature carrier plate 44 to hold the induction coils and magnets in place. It can be seen that with the exception of the armature assemblies at either end of the generator, this design employs both sides of both the stator and armature to house magnets and induction coils thus reducing manufacturing costs. As well, this design will assist in balancing out the bending force on the armature and stator plates by offsetting the three on one side of the plate, with the force being created on the other side of the plate.

The base feet 32 of the device will secure the system to a footing and may be manufactured as a single plate that as well holds the stator coils securely in place. FIG. 16 illustrates a generator section with 4 stator arrays having removed a cross section of the upper right quadrant. In this design the induction coil cores 42 are mounted on the stator plates 38 and are tightly packed between the armature plates 44. Wires from each coil will pass through a hole in the stator plate 38 and may be housed in a channel on the outer edge of the plate. Wires may come together at the controller mounting brackets 85 that will direct the wiring into the circuit box.

Figure 17:
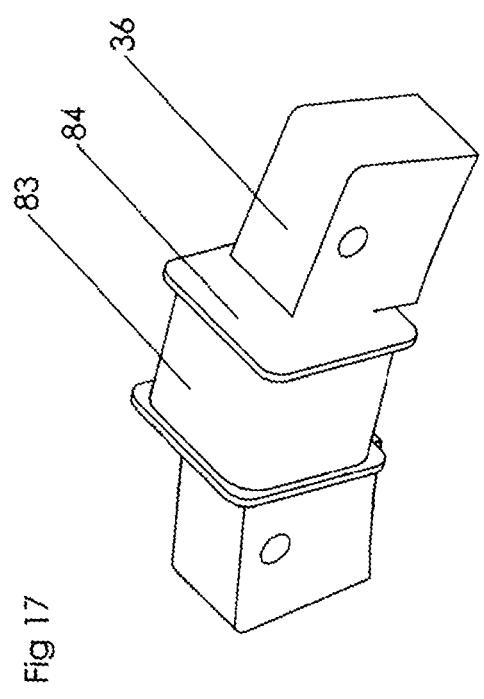
FIG. 17 is, a front perspective view of a one embodiment of a single hybrid permanent magnet which will also act as an electromagnet.

FIG. 17 illustrates a hybrid magnetic device that may be employed in the generator. The magnet in this design may be simply two magnets at either pole with an appropriate ferromagnetic material serving as the housing between the two and thus allowing the two magnets to act as one larger magnet. This permanent magnet may be fitted with a coil in the middle so as to allow the magnet to function as well as an electromagnet. The electromagnet may or may not utilize a bobbin 84 to hold the wire coil 83 in place. An alternate design for this hybrid magnet might be encasing only one magnet in the housing material rather than two. This can be done by simply encasing a permanent magnet in the middle of the housing material, in this illustration, underneath the wire coil 83. This hybrid magnet can act as a permanent magnet with the potential for greater control in serving as an electromagnet as well. In addition, this magnetic arrangement is particularly advantageous in a closed flux path environment. Research shows that the collective flux density of the combined magnet and electromagnet is beyond simply adding up the two forces when applied in a closed path arrangement.

Another embodiment is where the magnetic device, as in FIG. 17, comprises two smaller magnets that are situated at either pole with a ferromagnetic material between and wherein the polarities of these magnets are opposed; that is where one is facing outwardly North, and the other outwardly South, and where there is an appropriate ferromagnetic material serving as the housing between the two magnets thus allowing the two magnets effectively act as one larger magnet.

The magnetic apparatus above fitted with a coil of magnet wire in the middle, between the poles, so as to allow the magnet to function as well as an electromagnet when a current is applied to the coil and where the electromagnet may or may not utilize a bobbin 84 to hold the wire coil 83 in place.

An alternate design for this apparatus where only one magnet is utilized rather than two, and where this single magnet is encased in or about the housing material such as to create a larger magnet with it's magnetic influence, and where a coil of magnet wire is wrapped around the middle section such as overtop of the magnet in the middle region of the ferromagnetic housing material, as would be the case if a magnet where placed under wire coil 83 in FIG. 17.

In an additional alternative embodiment, which is a Closed Flux Path Induction, the generator has two magnets, and two field coils, in a closed loop configuration thus allowing a completed path for magnetic flux. There is a completed flux path where the magnets are in the shape of horseshoes and where the poles of both magnets are facing towards each other and where there are induction cores that when aligned with the poles of the magnets, will create a closed loop pathway for flux through both magnets, and both coils. There is an armature disk having a multitude of radially inner and outer magnetic influences that along with the stator's induction coils create a multitude of closed flux path induction stages within a single armature and stator assembly. The armature having an inner and outer magnetic assembly in a non-symmetrical fashion so as to allow for a multitude of phases to be created from a single armature interacting with a single stator array and where the desired force balancing effect is still accomplished as is done with three armatures or stators offset to balance out forces. In this embodiment, the generator will have an inner and outer magnets that may, or may not be, of similar size and where either inner or outer magnet may be replaced with a ferromagnetic material or an electromagnet rather than utilizing a permanent magnet. The above closed flux path apparatus utilizing electromagnets for inner or outer magnets, or both and may utilize hybrid magnets for inner or outer magnets, or both. Any combination of permanent magnets, electromagnets, or ferromagnetic materials may be used to complete the flux path in this embodiment.

The generator, one embodiment, will function as its own gearbox where the generator that is of itself and electronic gearbox and that as well offers a convenient and integrated electrical breaking system. This configuration will have a method of controlling the rotational speed of the rotor in such a way as to avoid shedding energy wherein the generator itself through a process of increasing or decreasing the number of independent coils engaged within the system allows the system to function as an efficient gearbox system controlling the rotational speed of the turbine without conventional shedding techniques. The generator can add resistance to the rotation of the rotor through the process of induction thereby slowing the rotor speed as additional stages are engaged as well as removing resistance to the rotation of the rotor through the process of electrically removing stages from the system. The generator can also allow for a direct-coupled (single cog) connection to the prime-mover rotor as a result of multiple stator poles and the resistance control system provided by the engagement and disengagement of a multitude of generator stages. The generator can also comprise of a unique staged internal generator that is combined with pre-processing electronics so as to allow the generator to function as its own electronic gearbox thus offering a more efficient energy capture system.

The generator can use a flywheel effect where there are any number of induction coils that are employed when at the same time other induction coils (with open circuits) are not employed, and where the rotor contains one or more armature plates rotating about the stators regardless of how many stages, or coils in the system, have closed circuits and are thus engaged, where the mass of the balanced stages of the armature disks rotate and serve to function as a flywheel that will stabilize the system from sudden and undesirable changes in rotational speed thus smoothing out the operation of the system and where said flywheel will store kinetic energy and will offer a mechanism for moderation of the rotational speed of the turbine thus smoothing out sudden changes in source energy and load.

The generator can set up to be capable of selecting various combinations for coils to create various output voltages where the pins or other electrical contacts may be disposed around the casing in a manner that allows the selection of various operating voltages for application when the apparatus is operating as either a motor or generator accomplished by connecting adjacent terminal layers in a selected orientation with respect to each other and where the orientation of coil contacts may be selected, such as to allow the operator to determine the resultant voltage being created if it is acting as a generator, or the appropriate input voltage, if it is acting as a motor (for example, the machine may run at 120 volts, 240 volts or 480 volts or offer an output of 120 volts, 240 volts, or 480 volts).

The generator can also have a parallel-series coil arrangement. In prior art, when using permanent magnets the output voltage is directly proportional to generator rpm. Therefore a generator designed to work at variable speeds must overcome the varying voltage output that results. The generator dynamically controls the arrangement of the coils so that at low speed (low voltage output) the coils are in series, therefore their voltages are summed to obtain the target voltage. As the speed increases the coils are connected in two series banks, the banks are connected in parallel. As speed increases again the coils are connected into four series banks and the banks are connected in parallel. Etc. Until at max operating speed (max voltage output from each coil) all the coils are connected in parallel. At this point an individual coil will be attaining a voltage equal to the low speed voltage of all the coils in series.

For Example: The theoretical desired output is 1000V. The theoretical generator has 10 coils. Each coil operates in a range from 100V (100 rpm) to 1000V (1000 rpm) depending on generator rpm. When the generator turns at 100 rpm all the coils are connected in series to obtain the desired output of 1000V. As the generator rpm increases the voltage will exceed 1000V. At 200 rpm the coils are split in too two series banks (both producing 1000V), the banks are connected in parallel. (Each coil produces 200V.times.5 coils=1000V). At 500 rpm the coils would be connected in parallel banks of 2. (each coil produces 500V.times.2 coils=1000V). At 1000 rpm all coils would be connected in parallel since each coil will be producing the desired output voltage.

The generator, in the preferred embodiment, is capable of functioning as a high output variable input motor divided into independent motor stages. This motor configuration is comprised of a multitude of stages where some stages may function as a motor while others are left disengaged and inactive. When functioning as a motor with a flywheel effect built in, all rotors may be turning at all times regardless of how many stages are actually engaged with closed circuits. Any number of stages may function as a generator while any number of alternate stages may function as a motor thus allowing the system to modify its state from a motor to a generator quickly and with ease. In certain applications it may be advisable to have some stages acting as a motor while other stages at the same time, act as a generator.

The generator has the benefit of the closed flux path induction process apparatus that allows for greater flexibility and choice in the selection of materials to be used in the construction of the generator system. The generator can have a multitude of isolated induction processes thereby allowing greater choice in the materials that can be used to create the generator system allowing lighter non metallic materials to be used for housings and other parts thereby reducing the system weight.

The unique disclosed generator offers a multi-stage power generation system designed to match generator resistance to source energy through electronically adding, or dropping, generator stages as input energy and load vary. In one embodiment, a single stage can be just one coil or for three phase output, three coils; one from each array in a three stator array arrangement for example. Additional benefits for the proposed generator systems are numerous and include reduced mechanical energy loss and a reduced requirement for conventional signal processing electronics.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation wilt be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of operating a generator, said generator comprising:
    a driveshaft;
    a first rotor rotatable by said driveshaft, said first rotor having a first array of magnets mounted thereon;
    a first stator having a first plurality of electrically conductive coils mounted thereon, wherein rotation of said first rotor relative to said first stator induces a current in at least some of said electrically conductive coils;
    said method comprising controlling an output voltage of said generator by dynamically modifying an electrical connection between coils of said first plurality of electrically conductive coils;
    wherein said first plurality of electrically conductive coils are grouped into a plurality of stages, each stage comprising at least one electrically conductive coil, wherein rotational resistance for rotating said driveshaft increases when each stage is electrically energized from an open to a closed circuit, said method further comprising selectively electrically energizing each of said stages to increase the rotational resistance for rotating said driveshaft when said driveshaft rotates at a predetermined rotational speed.

2. The method of claim 1 wherein said generator is providing electrical power to a variable load, and a series-parallel electrical connection between coils is modified to provide a predetermined output voltage over a range of electrical loads.

3. The method of claim 1 wherein said magnets are permanent magnets.

4. The method of claim 1 wherein said magnets are hybrid magnets.

5. The method of claim 1 wherein said first rotor is rigidly couple to said driveshaft.

6. The method of claim 1 wherein said generator has a single rotor and a single stator.

7. The method of claim 6 wherein said first plurality of electrically conductive coils and said first array of magnets are mutually arranged to provide multi-phase output from said generator.

8. The method of claim 1 further comprising electronically checking the integrity of said at least one coil in each stage prior to electrically energizing that stage and, if a fault is detected then not electrically energizing that stage.

9. The method of claim 1 wherein the number of stages that is electrically energized is dynamically modified based on at least one of: an input energy from the driveshaft and an electrical load on said generator.

10. The method of claim 1 wherein said generator further comprises:
    a second rotor and a third rotor, each rotatable by said driveshaft, said second rotor having a second array of magnets mounted thereon, and said third rotor having a third array of magnets mounted thereon; and
    a second stator and a third stator, said second stator having a second plurality of electrically conductive coils mounted thereon, and said third stator having a third plurality of electrically conductive coils mounted thereon;
    wherein said method farther comprises controlling an output voltage of said generator by dynamically modifying an electrical connection between coils of each of said first, second and third plurality of electrically conductive coils.

11. The method of claim 10 wherein said first, second and third plurality of electrically conductive coils are offset mechanically relative to one another to provide three-phase output.

12. A multi-coil generator comprising:
    a driveshaft;
    a first rotor rotatable by said driveshaft, said first rotor having a first array of magnets mounted thereon;
    a first stator having a first plurality of electrically conductive coils mounted thereon, said first plurality of electrically conductive coils grouped into a plurality of stages, each stage comprising at least one electrically conductive coil, wherein rotation of said first rotor relative to said first stator induces a current in at least some of said electrically conductive coils; and
    control electronics coupled to control an output voltage of said generator by dynamically modifying an electrical connection between coils of said first plurality of electrically conductive coils,
    wherein the control electronics selectively electrically energizes the electrically conductive coils between open and closed circuits to increase the rotational resistance for rotating said driveshaft when said driveshaft rotates at one or more predetermined rotational speeds.

13. The multi-coil generator of claim 12 wherein said control electronics modifies a series-parallel electrical connection between coils, to provide a substantially constant output voltage over a range of driveshaft rotation speeds.

14. A method of operating a generator, the generator comprising: a driveshaft; a first rotor rotatable by said driveshaft, said first rotor having a first array of magnets mounted thereon; a first stator having a first plurality of electrically conductive coils mounted thereon, said first plurality of electrically conductive coils grouped into a plurality of stages, each stage comprising at least one electrically conductive coil, wherein rotation of said first rotor relative to said first stator induces a current in at least some of said electrically conductive coils, the method comprising:

at a first time, selectively activating a first set of electrically conductive coils and deactivating any remaining electrically conductive coils to achieve a first power output; and at a second time, selectively activating a second set of electrically conductive coils and deactivating any remaining electrically conductive coils to achieve a second power output, the second set different than the first set, and the second power output different from the first power output.

15. The method of claim 1 wherein selectively activating a first set of electrically conductive coils and deactivating any remaining electrically conductive coils to achieve a first power output includes selectively activating the first set of electrically conductive coils and deactivating the remaining electrically conductive coils to achieve the first power output at a first frequency, and selectively activating a second set of electrically conductive coils and deactivating any remaining electrically conductive coils to achieve a second power output includes selectively activating the second set of electrically conductive coils and deactivating the remaining electrically conductive coils to achieve the second power output at the first frequency.

* * * * *